(12) United States Patent
Rodriguez et al.

(10) Patent No.: US 10,798,432 B2
(45) Date of Patent: Oct. 6, 2020

(54) METHOD AND SYSTEM FOR PROCESSING HEVC CODED VIDEO IN BROADCAST AND STREAMING APPLICATIONS

(71) Applicant: Cisco Technology, Inc., San Jose, CA (US)

(72) Inventors: Arturo A. Rodriguez, Norcross, GA (US); Kevin Murray, Hampshire (GB); Hsiang-Yeh Hwang, Duluth, GA (US); Akira Osamoto, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 800 days.

(21) Appl. No.: 15/017,572

(22) Filed: Feb. 5, 2016

(65) Prior Publication Data

US 2016/0234527 A1   Aug. 11, 2016

Related U.S. Application Data

(60) Provisional application No. 62/112,460, filed on Feb. 5, 2015, provisional application No. 62/112,632, filed
(Continued)

(51) Int. Cl.
*H04N 19/70* (2014.01)
*H04N 19/593* (2014.01)
(Continued)

(52) U.S. Cl.
CPC ......... *H04N 21/2387* (2013.01); *H04N 5/783* (2013.01); *H04N 19/44* (2014.11);
(Continued)

(58) Field of Classification Search
CPC ........ H04N 19/70; H04N 19/44; H04N 19/46; H04N 19/503; H04N 19/593; H04N 19/65;
(Continued)

(56) References Cited

U.S. PATENT DOCUMENTS 9,026,671 B2    5/2015 Gillies et al.
2010/0215338 A1  8/2010 Rodriguez
(Continued)

FOREIGN PATENT DOCUMENTS

EP    2757795 A1    7/2014

OTHER PUBLICATIONS

Office Action issued in U.S. Appl. No. 15/017,581, dated Jun. 29, 2018, 25 pages.
(Continued)

*Primary Examiner* — Matthew K Kwan
(74) *Attorney, Agent, or Firm* — Merchant & Gould P.C.

(57) ABSTRACT

Embodiments of the present disclosure specify methods and systems for processing a video stream. For example, a video stream may be received at a video processing device. The video stream may comprise video usability syntax elements. The video usability syntax elements may comprise at least a first flag indicative of whether HRD parameters are present for one of fixed frame rate processing or low delay mode processing. The video usability syntax elements may also comprise at least a second flag indicative of whether the video stream comprises field-coded video sequences.

20 Claims, 12 Drawing Sheets

Related U.S. Application Data on Feb. 5, 2015, provisional application No. 62/114,145, filed on Feb. 10, 2015.

(51) Int. Cl.

| | |
|---|---|
| *H04N 19/44* | (2014.01) |
| *H04N 19/46* | (2014.01) |
| *H04N 19/503* | (2014.01) |
| *H04N 21/2387* | (2011.01) |
| *H04N 5/783* | (2006.01) |
| *H04N 21/845* | (2011.01) |
| *H04N 19/65* | (2014.01) |
| *H04N 21/438* | (2011.01) |
| *H04N 21/6587* | (2011.01) |
| *H04N 19/423* | (2014.01) |

(52) U.S. Cl.
CPC ........... *H04N 19/46* (2014.11); *H04N 19/503* (2014.11); *H04N 19/593* (2014.11); *H04N 19/65* (2014.11); *H04N 19/70* (2014.11); *H04N 21/4384* (2013.01); *H04N 21/6587* (2013.01); *H04N 21/8451* (2013.01); *H04N 19/423* (2014.11)

(58) Field of Classification Search
CPC .. H04N 19/423; H04N 5/783; H04N 21/2387; H04N 21/4384; H04N 21/6587; H04N 21/8451
USPC .................................................... 375/240.25
See application file for complete search history.

(56) References Cited

U.S. PATENT DOCUMENTS

| | | | |
|---|---|---|---|
| 2013/0308926 A1 | 11/2013 | Yang et al. | |
| 2015/0195561 A1 | 7/2015 | Wang et al. | |
| 2016/0234537 A1 | 8/2016 | Rodriguez et al. | |
| 2016/0261924 A1* | 9/2016 | Hwang | .............. H04N 21/2387 |
| 2016/0323609 A1 | 11/2016 | Yoon | |

OTHER PUBLICATIONS

Copending U.S. Appl. No. 15/017,581, filed Feb. 5, 2016 entitled "PVR Assist Information for HEVC Bitstreams".

Partial International Search Report dated May 4, 2016 cited in Application No. PCT/US2016/016902, 13 pgs.

Recommendation ITU-T H.265, "High Efficiency Video Coding", Series H: Audiovisual and Multimedia Systems Infrastructure of audiovisual services—Coding of moving video, International Telecommunication Union, Geneva, CH, Apr. 13, 2013, pp. 1-317, XP017578238.

Anonymous, "AVC Video Systems and Transport Constraints for Cable Television," Society of Cable Telecommunications Engineers, Engineering Committee, Digital Video Subcommittee, American National Standard ANSI/SCTE 128 2010-a, Jan. 1, 2010, XP030001609, 42 pgs.

Thomas Schierl et al., "System Layer Integration of High Efficiency Video Coding," IEEE Transactions on Circuits and Systems for Video Technology, IEEE Service Center, Piscataway, NW, vol. 22, No. 12, Dec. 1, 2012, pp. 1871-1884, XP011487157.

ITU-T Recommendation H.264, "Advanced video coding for generic audiovisual services," Series H: Audiovisual and Multimedia Systems Infrastructure of audiovisual services—Coding of moving video, International Telecommunication Union, Geneva, CH, Mar. 1, 2005, pp. 1-343, XP017465245.

Society of Cable Telecommunications Engineers, Engineering Committee Digital Video Subcommittee, American National Standard, ANSI/SCTE 215-1 2015, "HEVC Video Constraints for Cable Television Part I—Coding," ii American National Standard, Dec. 1, 2015, XP055267744, retrieved from the Internet: URL:http://www.scte.org/SCTEDocs/Standards/ANSI_SCTE 215-1.pdf, 23 pgs.

International Search Report dated Jun. 3, 2016 cited in Application No. PCT/US2016/016903, 13 pgs.

"Digital Video Broadcasting (DVB); Specification for the use of Video and Audio Coding in Broadcasting Applications Based on the MPEG-2 Transport Stream," Technical Specification, European Telecommunications Standards Institute (ETSI), 650, Route des Lucioles, F-06921 Sophia-Antipolis; France, vol. Broadcas, No. V1.11.1, Nov. 1, 2012, XP014092645, 195 pgs. (ISR dated Jun. 3, 2016).

International Search Report dated Jul. 11, 2016 cited in Application No. PCT/US2016/016902, 26 pgs.

Final Office Action issued in U.S. Appl. No. 15/017,581, dated Jan. 24, 2019, 19 pages.

First Office Action and Search Report dated Jul. 3, 2019, cited in Chinese Patent Application No. 201680007977.3, 19 pages.

Second Office Action dated Jan. 17, 2020, cited in Chinese Patent Application No. 201680007977.3, 16 pages.

\* cited by examiner

METHOD AND SYSTEM FOR PROCESSING HEVC CODED VIDEO IN BROADCAST AND STREAMING APPLICATIONS

CROSS-REFERENCE TO RELATED APPLICATIONS

Under provisions of 35 U.S.C. § 119(e), Applicants claim the benefit of U.S. Provisional Application No. 62/112,460, filed Feb. 5, 2015, U.S. Provisional Application No. 62/112,632, filed Feb. 5, 2015, and U.S. Provisional Application No. 62/114,145, filed Feb. 10, 2015, which are incorporated herein by reference.

TECHNICAL FIELD

This disclosure relates in general to processing of video signals, and more particularly, to provisioning supporting functionality of HEVC bitstreams.

BACKGROUND

Compressed video signals must include provisions that extend random access and other functionality in broadcast and streaming of video programs. These provisions must support video signals that correspond to different picture formats and that may be coded into respected bitstreams according to any of a plethora of possible combinations of compression alternatives. Trick modes, also known as video playback modes other than the normal playback mode intended for a video program, may be enacted during viewing when a user wishes to invoke modes such as fast forward playback, fast reverse playback, slow forward playback, slow reverse playback, forward frame (or picture) stepping, reverse frame (or picture) stepping, and pause. Coupled with random access that enables entry at points of a coded video stream where a decoder can start decoding the coded video stream (referred to herein as a bitstream), trick modes may be supported for applications such as personal video recording ("PVR"), digital video recording ("DVR"), and video on demand ("VOD").

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
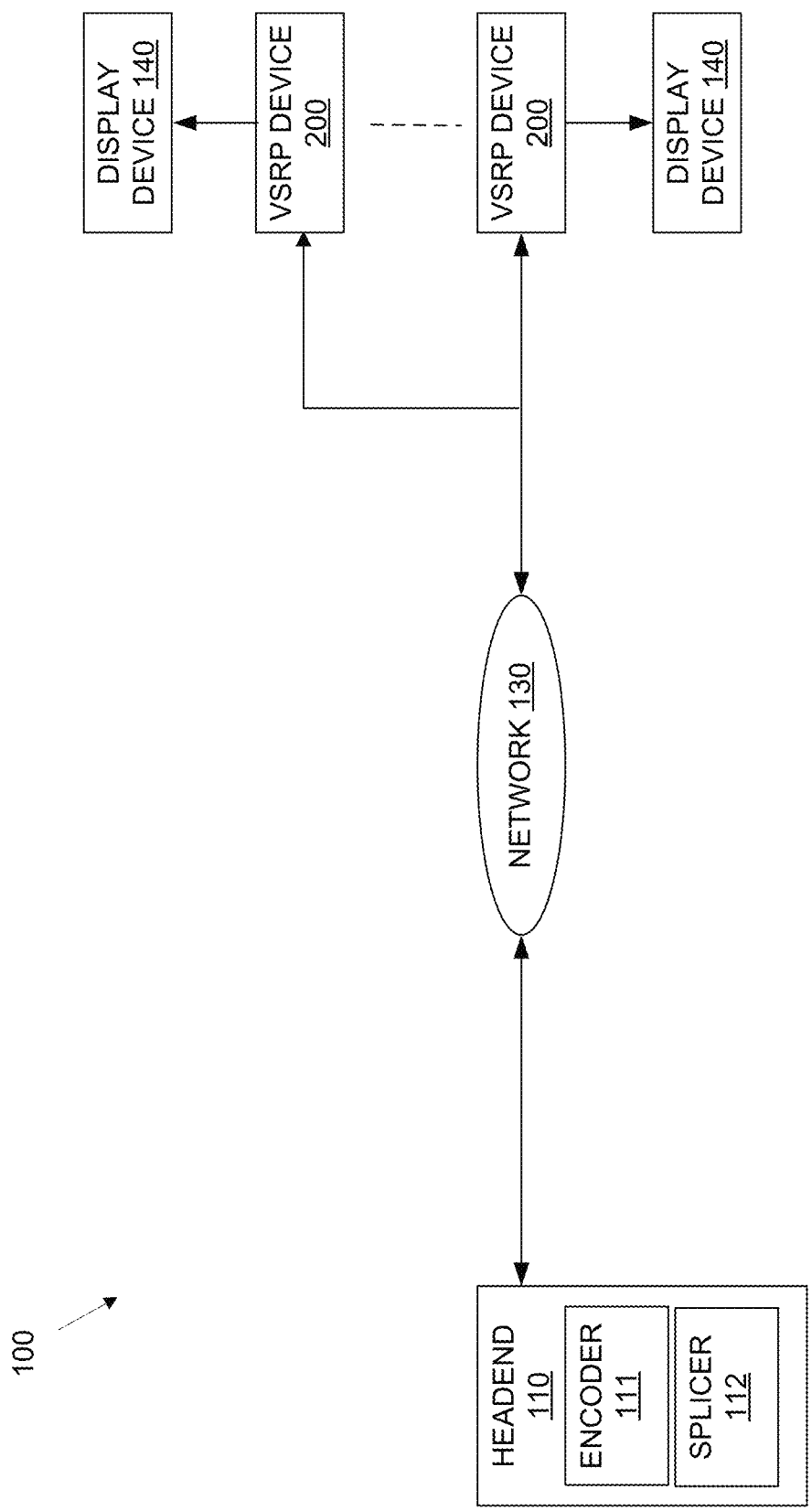
FIG. 1 is a block diagram that illustrates an example environment in which video processing (VP) systems and methods may be implemented.

Embodiments of the present disclosure specify methods and systems for processing a video stream. For example, a video stream may be received at a video processing device. The video stream may comprise video usability syntax elements. The video usability syntax elements may comprise at least a first flag indicative of whether HRD parameters are present for one of fixed frame rate processing or low delay mode processing. The video usability syntax elements may also comprise at least a second flag indicative of whether the video stream comprises field-coded video sequences.

Embodiments of the present disclosure specify the creation of an HEVC coded video elementary stream and is intended for video services applications such as broadcast, time-shifting (e.g., PVR/DVR service), Video-on-Demand services, and splicing (e.g., Ad-insertion) that could employ the specifications described herein. There exists a need in High Efficiency Video Coding ("HEVC") bitstreams to provide assistance information to help applications effectuate requested trick modes. The following definitions and acronyms are used in the present disclosure:

ACRONYMS

AU Access Unit
BLA Broken Link Access
CPB Coded Picture Buffer
CRA Clean Random Access
CVS Coded Video Sequence
DPB Decoded Picture Buffer
DPI Digital Program Insertion
DTS Decoding Time Stamp
FPP Forward Predicted Picture
HDTV High Definition Television
IDR Instantaneous Decoding Refresh
IRAP Intra Random Access Point in accordance with the HEVC Specification (H.265)
ISO International Organization for Standardization
MPEG Moving Picture Experts Group
NAL Network Abstraction Layer
nPVR Network based Personal Video Recorder
PES Packetized Elementary Stream
POC Picture Order Count
PPS Picture Parameter Set
PTS Presentation Time Stamp
PVR Personal Video Recorder RADL Random Access Decodable Leading (Picture)
RASL Random Access Skipped Leading (Picture)
SEI Supplemental Enhancement Information
SGOP Group Of Pictures in accordance to this document
SHRAP HEVC Random Access Point in accordance to this document
SPS Sequence Parameter Set
TS Transport Stream
VOD Video on Demand
VUI Video Usability Information Definitions HEVC Specification—refers to the syntax and semantics for video coding in ITU-T Rec. H. 265|ISO/IEC 23008-2:2013 High Efficiency Video Coding.
HEVC Receiver—refers to a receiver capable of decoding HEVC bitstreams in accordance with the HEVC Specification and the constraints specified in the present disclosure.
FPP—A predicted picture that does not use any later-displayed picture as a reference. A later displayed picture refers to a picture with a higher POC or a picture with a later PTS.
IRAP—IRAP as specified in HEVC Specification
GOP—Group of Pictures (GOP) is the group of pictures spanning two consecutive SHRAPs, starting with and SHRAP AU but not including the subsequent SHRAP AU.
SHRAP Picture—An IRAP picture that is part of an SHRAP Access Unit or an intra-coded field picture with NAL unit type=TRAIL_R that is part of an SHRAP AU.

HEVC bitstreams may include the SEI and the VUI syntactic elements as specified in HEVC Specification. The value of nuh_temporal_id_plus1 is set equal to 1 for all NAL units in an SHRAP AU.

If the value of field_seq_flag in the VUI parameters is equal to 0, the SHRAP picture shall have a nal_unit_type value in the range of 16 to 21, inclusive. This range of nal_unit_type values may correspond to an IRAP picture in accordance with the HEVC Specification.

When the value of field_seq_flag in the VUI parameters is equal to 1, the SHRAP picture shall correspond to an intra-coded field picture with a NAL_unit_type value that is either: 1) in the range of 16 to 21, inclusive, or 2) equal to 1.

Figure 11:
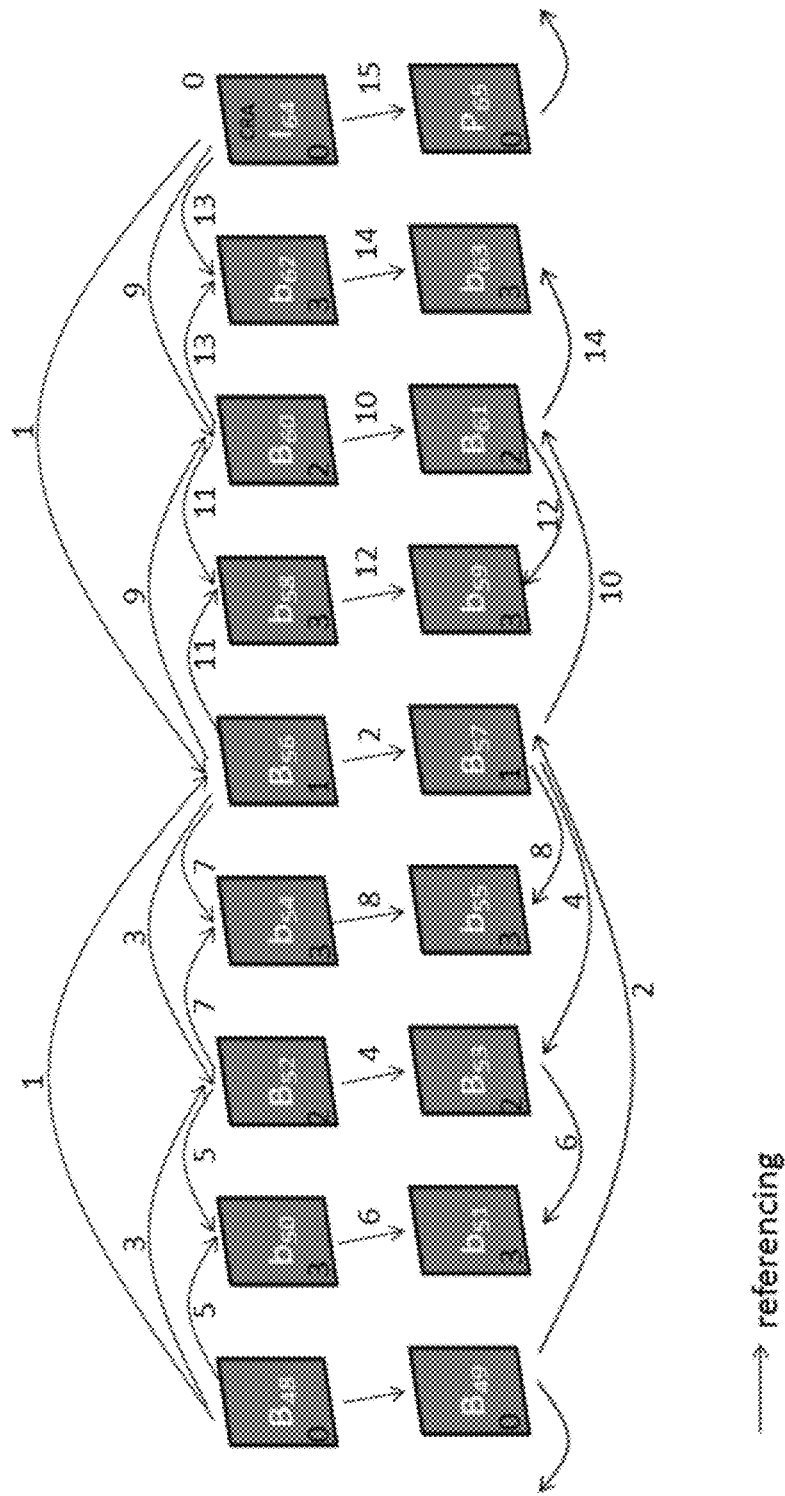
FIG. 11 illustrates a field-coding structure with an I picture with NAL unit equal to CRA.
Figure 12:
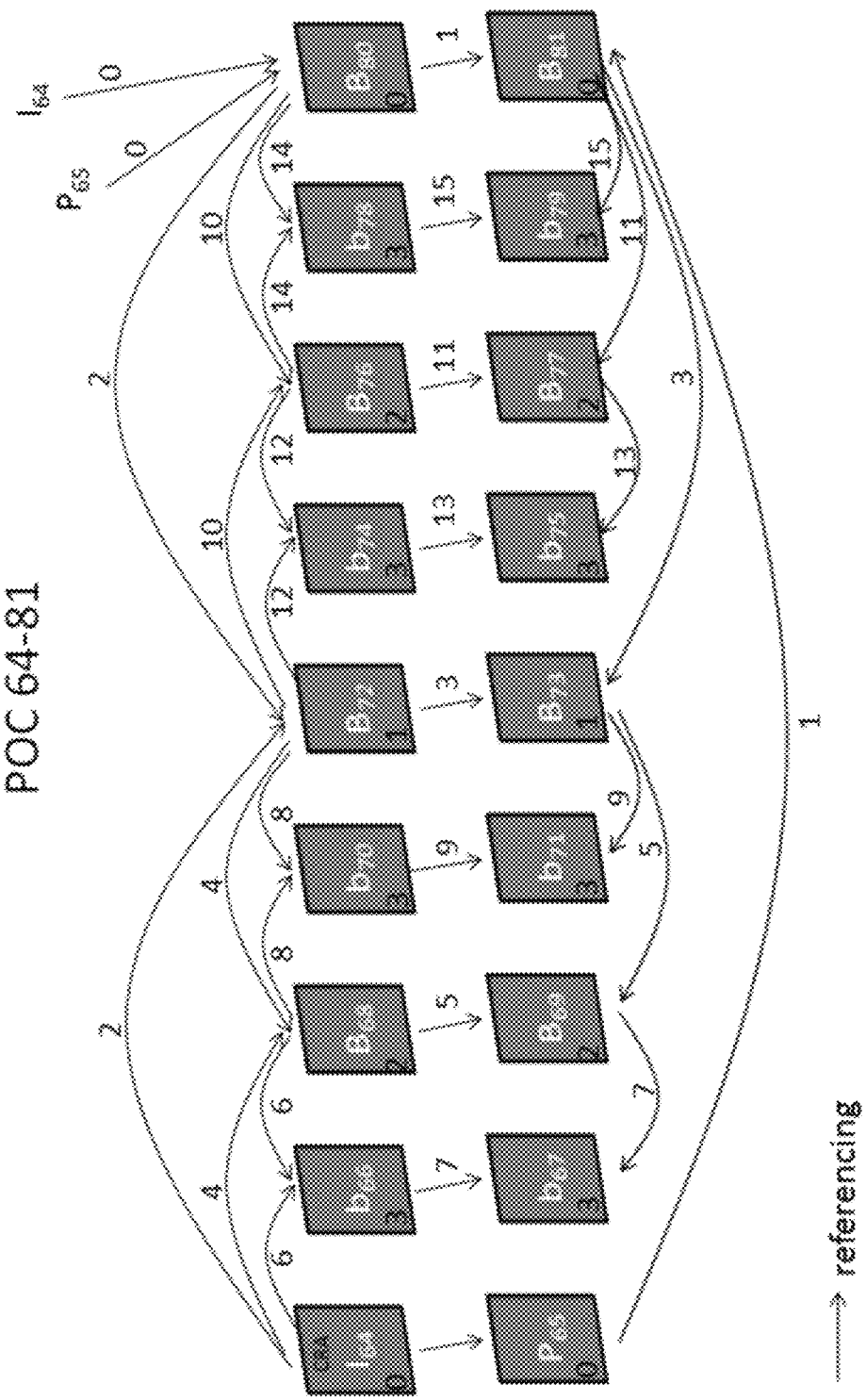
FIG. 12 illustrates a field-coding structure with an I picture with NAL unit equal to CRA.

A NAL_unit_type value equal to 1 may correspond to TRAIL_R. The value of field_seq_flag in the VUI parameters is equal to 1 if the NAL unit type of an SHRAP is equal to 1. A SHRAP picture with NAL unit type corresponding to TRAIL_R does not follow an access unit containing an end of sequence NAL unit. The first access unit after an access unit that contains an end of sequence NAL unit will be the access unit of an SHRAP containing an IDR, BLA, or CRA picture. The field coding sub-GOP structure with an I picture containing a NAL_unit_type value equal to TRAIL_R is described in further detail in regards to FIGS. 9-10. The field coding sub-GOP structure with an I picture containing a NAL_unit_type value that is not equal to TRAIL_R, but rather equal to an IRAP as described in the HVEC specification, as described in further detail in regards to FIGS. 11-12. In FIGS. 11-12, the NAL_unit_type of the IRAP is a CRA.

The first access unit after an access unit that contains an end of bitstream NAL unit shall be an IDR access unit corresponding to an SHRAP. The access unit delimiter, corresponding to NAL unit type equal to 35 (AUD_NUT) in accordance with HEVC Specification, shall be present and be the first NAL unit in each access unit.

The following table lists the restrictions in regards to nal_unit_types:

TABLE 1

Constraints on NAL Unit Types

| nal_unit_type | Category of nal_unit_type | Guidance | Note |
|---|---|---|---|
| 2-5 | TSAs, STSAs | Prohibited from use | sps_temporal_id_nesting_flag = 0 |
| 16-21 | Coded slice of IRAP picture: BLA_W_LP, BLA_W_RADL, BLA_N_LP, IDR_W_RADL, IDR_N_LP, CRA_NUT | Use for SHRAP picture when field_seq_flag = 0 or 1 | |
| 1 | Coded slice for TRAIL_R picture | Use for trailing reference pictures, or for SHRAP picture when field_seq_flag = 1 | |
| 35 | Access unit delimiter: AUD_NUT | Each access unit shall contain and start with AUD_NUT | |
| 36 | End of sequence: EOS_NUT | The next AU after an AU containing an end of sequence NAL unit shall be an IDR AU, BLA AU, or CRA AU | An SHRAP containing an TRAIL_R AU is prohibited from following an end of sequence AU |
| 37 | End of bitstream: EOB_NUT | The next AU after an AU containing an end of bitstream NAL unit shall be an IDR AU | The next AU must be an SHRAP that is an IDR AU |

All HEVC Receivers are expected to be capable of processing HEVC Bitstreams corresponding to plural formats.

Sequence Parameter Set (SPS) Constraints

The Sequence parameter set includes vui_parameters_present_flag with a value equal to 1.

VUI

The HEVC Receiver is expect to process the following VUI syntax elements when present. The vui_hrd_paramets_present_flag may be equal to 0 or 1.

TABLE 2

Video Usability Information Constraints

| VUI Header Syntactic Element | Allowed Value |
| --- | --- |
| field_seq_flag | 0 (or 1 for a field-coded video sequence). |
| frame_field_info_present_flag | 1 |
| vui_hrd_parameters_present_flag | fixed frame rate: 0 (preferred) or 1 Low Delay mode: = 1 |

In some embodiments, some Syntactical elements may require that the corresponding preceding flag, "xxx_present_flag", if it exists, be equal to 1 (for example, the colour_description_present flag). The value of field_seq_flag shall be equal to 1 only for field-coded video sequences.

In accordance with Annex E of the HEVC Spec, HRD parameters may be conveyed to decoders by other means not specified. HRD parameters shall be constrained when present as shown in Tables 3 and 4.

In some embodiments, a fixed frame rate bitstream may or may not include HRD parameters. When vui_hrd_parameters_present_flag=0, the bitstream shall comply to a fixed picture rate and the parameter values shown in Table 3 may be inferred. A fixed frame rate bitstream with vui_hrd_parameters_present_flag=1 shall be constrained with parameter values shown in Table 3. In some embodiments, low_delay_hrd_flag [maxNumSubLayersMinus1]=0 when fixed_pic_rate_general_flag[maxNumSubLayersMinus1]=1.

TABLE 3

HRD Parameter Constraints for fixed frame rate

| | Allowed Value | |
| --- | --- | --- |
| HRD Syntactic Element | i = maxNumSubLayersMinus1 | i < maxNumSubLayersMinus1 |
| nal_hrd_parameters_present_flag | 0 | 0 |
| vcl_hrd_parameters_present_flag | 0 | 0 |
| fixed_pic_rate_general_flag [ i ] | 1 | 0 |
| fixed_pic_rate_within_cvs_flag [i] | inferred = 1 | 0 |
| elemental_duration_in_tc_minus1 [i] | 0 | 0 |
| low_delay_hrd_flag[ i] | 0 | 0 |

The value of vui_hrd_parameters_present_flag may be equal to 1 for Low Delay mode. HRD parameters shall have the values shown in Table 4 for Low Delay Mode. In Low Delay Mode: 1) All pictures shall be intra coded pictures or FPP pictures. 2) The PTS each picture shall be equal to or inferred equal to its DTS. The DTS may or may not be present in the PES packet header. 3) Each picture in the bitstream shall be greater than the PTS of the prior picture. 4) Each decoded picture shall be output repeatedly until the next decoded picture is available. 5) The CPB may underflow. In some embodiments, an HEVC receiver may ignore the information in the pic_timing SEI, if present, in Low Delay Mode.

TABLE 4

HRD Parameter Constraints for Low Delay Mode

| | Allowed Value | |
| --- | --- | --- |
| HRD Syntactic Element | i = maxNumSubLayersMinus1 | i < maxNumSubLayersMinus1 |
| nal_hrd_parameters_present_flag | 0 | 0 |
| vcl_hrd_parameters_present_flag | 0 | 0 |
| fixed_pic_rate_general_flag [ i ] | 0 | 0 |
| fixed_pic_rate_within_cvs_flag [i] | 0 | 0 |
| elemental_duration_in_tc_minus1 [i] | 0 | 0 |
| low_delay_hrd_flag [ i ] | 1 | 0 |

Picture Parameter Constraints and Level Limits

The picture parameter set should be consistent with the signaled level and profile (either Main or Main 10). HEVC Bitstreams must not include non-paired fields. In the context of HEVC, paired fields are two fields that are in consecutive access units in decoding order as two coded fields of opposite parity of the same frame, regardless their display order.

All pictures in HEVC Bitstreams may be displayable pictures except when a RASL picture of an associated IRAP has unavailable reference pictures, such as upon entering the HEVC bitstream at a random access point or SHRAP.

Supplemental Enhancement Information (SEI) Constraints

When the SHRAP picture has a NAL unit type in the range from 16 to 21, the output recovery point is derived from the NAL unit type of the respective coded pictures in accordance with the HEVC Specification.

In one embodiment, the recovery point SEI is optional and shall only be present in the AU of an SHRAP picture with NAL unit type equal to 1 (TRAIL_R). A coded field video sequence containing a SHRAP corresponding to a TRAIL_R picture may have an output recovering point not later than the output time of the SHRAP picture. The recovery point SEI may be used to signal a recovery point that precede the output time of the SHRAP picture, such as when some pictures with output time earlier than the SHRAP picture are backward predicted from the SHRAP picture or the field paired with the SHRAP picture. When the recovery point SEI is present, the value of exact_match_flag shall be set to 1, and the value of broken_link_flag shall be set to 0. In some embodiments of the present disclosure, an HEVC receiver may ignore the recovery point SEI. In alternate embodiment, the recovery point SEI is not provided in the HEVC bitstream when the AU of a SHRAP picture with NAL unit type equal to 1 (TRAIL_R).

The field coded video sequence may contain only paired fields. The pic_struct in the pic_timing SEI shall not be equal to 1 or 2. The field paired with a field-coded SHRAP picture with a NAL unit type corresponding to TRAIL_R shall not reference a picture that precedes the SHRAP picture in the bitstream.

Pictures after the SHRAP picture in the bitstream that have output time prior to the SHRAP picture are leading pictures. The PTS of a picture may be used to identify leading pictures after the SHRAP picture. The PTS is not sufficient to distinguish between decodable and non-decodable leading pictures. Upon entering a bistream at an SHRAP AU containing a field-coded picture with NAL unit type corresponding to TRAIL_R, except for the coded field paired with the SHRAP picture, the following derivations and inferences shall be made:

1) All pictures with a PTS prior to the PTS of the SHRAP shall be leading pictures.
2) If the recovery point SEI is present in the SHRAP AU:
   2a) Any leading pictures with a PTS prior to the recovery point specified by the recovery point SEI shall be inferred as a RASL picture, and
   2b) Any leading pictures that are not inferred as a RASL picture shall be inferred as a RADL picture.
3) If the recovery point SEI is not present in the SHRAP AU:
   3a) All leading pictures shall be inferred as RASL pictures.
4) The value of NoRaslOutputFlag shall be equal to 1 for each inferred RASL picture, It should be noted that when supporting AFD, bar data, and closed captioning related SEI information shall comply with what is described in SCTE 128-1.

The Maximum Luma Picture Size, Max Video Bit Rate, and Max CPB (Coded Picture Buffer) for a particular Profile, Level, and Tier may not exceed the limitations set forth in Appendix A of the HEVC specification unless otherwise specified within this disclosure.

Program Splicing Constraint

System processes (such as digital ad insertion and program splicing) may require a resolution change in the HEVC stream within the same program that results in a seamless or near-seamless behavior in the HEVC receiver. When a user of this standard wishes to facilitate such a change, the HEVC elementary stream shall be encoded in accordance with these additional constraints: 1) If such seamless or near-seamless behavior in the HEVC receiver is desired, then general_level_idc and the vertical picture size in the HEVC elementary stream should not change within the same program. 2) Profile changes, display aspect ratio changes, frame rate changes, and interlaced/progressive transitions (in either order) should be avoided in some embodiments as they may result in disruption of the decoder's video output.

A DPI operation that returns to the network feed at an SHRAP AU containing a field-coded picture with NAL unit type corresponding to TRAIL_R shall change the NAL unit type of the SHRAP picture from TRAIL_R to BLA or IDR. If the NAL unit type is changed to BLA, except for the coded field paired with the SHRAP picture, the NAL unit type of each picture after the SHRAP picture in decode order that is determined to be a leading picture and has a derived temporal id value greater than 0 shall be changed to a NAL unit type corresponding to the RASL NUT.

PVR Assist Information

In some embodiments of the present disclosure, the tier value=temporal_id of a picture (as derived from NAL unit header information) when temporal id value is derived=0 and the picture is an SHRAP. Otherwise, the tier value=temporal id of the picture. In alternate embodiments, the tier value=temporal_id of a picture (as derived from NAL unit header information) when temporal id value is derived=0 and the picture is an intra coded picture. Otherwise, the tier value=temporal id of the picture In some embodiments, if maxNumSubLayersMinus1 is greater than 1, for pictures with temporal id=maxNumSubLayersMinus1, the tier value of the corresponding picture is 7. In other embodiments, if maxNumSubLayersMinus1 is greater than 1, for pictures with temporal id=maxNumSubLayersMinus1, the tier value of the corresponding picture is either 6 or 7. In other further embodiments, if maxNumSubLayersMinus1 is greater than 1, for pictures with temporal id=maxNumSubLayersMinus1, the tier value of the corresponding picture is either 6 or 7 if the picture is a non-reference picture. It should be noted that in the latter set of embodiments when maxNumSubLayersMinus1 is greater than 1, the tier may not be equal to temporal id+1.

In some embodiments, the tier is not equal temporal id+1 for pictures with temporal id=maxNumSubLayersMinus1 if maxNumSubLayersMinus1 is greater than a threshold specified in the adaptation field of an MPEG-2 Transport packet, and where such a threshold is greater than or equal to 1. If a picture's temporal id=maxNumSubLayersMinus1, its tier value may be mapped to 7 in one embodiment, or to 6 or 7 in another embodiment.

DETAILED DESCRIPTION OF EMBODIMENTS

Embodiments of the present disclosure provide support for trick modes, typically known as video playback modes other than the normal playback mode intended for a video program, where the normal playback mode is typically associated with forward playback at 1× speed (i.e., the intended speed). Trick modes may include modes such as fast forward playback, fast reverse playback, slow forward playback, slow reverse playback, forward frame (or picture) stepping, reverse frame (or picture) stepping, and pause. In pause the picture is frozen in the display device.

Coupled with random access that enables entry at points of a video stream where a decoder can start decoding the video stream, herein also referred to as a bitstream, trick modes support applications, such as personal video recording (PVR), digital video recording (DVR), and video on demand (VOD). In these applications a viewer can control trick mode functionality via a user input interface and input device such as a keyboard or a remote control.

Embodiments of the present disclosure, specify signals or messages that pertain to information that provisions trick modes and random access in data fields of the transport stream that carries the plural elementary streams of a video program. In embodiments, the transport stream can be MPEG-2 transport as specified in ISO/IEC 13818-1, (2007), "Information Technology—Generic coding of moving pictures and associated audio—Part 1: Systems," which is incorporated herein by reference. The information that provisions trick modes is referred herein as PVR assistance information. Furthermore, this document pertains to video streams that correspond to picture sequences that have been coded according to the HEVC video coding specification, specified by ITU-T Rec H.265|ISO/IEC 23008-2-MPEG-H Part 2: High Efficiency Video Coding, which is also incorporated herein by reference.

PVR assist information may be used to signal information with the aim of helping applications, such as PVR and VOD to perform trick-play operations but does not mandate any specific PVR device behavior. Rather, the application or receiving device (or processing device that processes the bitstream in a receiver) may effect a certain behavior of trick mode based on the PVR assist information. The information herein is specific to a video stream coded according to the H.265/HEVC video coding specification, specified by ITU-T Rec H.265|ISO/IEC 23008-2—MPEG-H Part 2: High Efficiency Video Coding, incorporated herein by reference. MPEG-2 transport specified in ISO/IEC 13818-1, (2013) provisions carriage of HEVC in MPEG-2 Transport and is incorporated herein by reference.

PVR assistance information as employed by embodiments of the present disclosure may be present at the start of each video access unit. PVR assist information may be carried in the Adaptation Field of MPEG-2 transport packets in non-encrypted form. PVR assist information, expressed by "PVR_assist_tierpic_num" may pertain to picture interdependencies with successive tier numbers, such that if decoding starts at a RAP of the bitstream, wherein the bitstream corresponds to the HEVC compressed version of the respective picture sequence of a video program, a self-decodable sub-stream can be extracted.

Furthermore, a flag in the PVR assist information may signal to an application or processing device of the bitstream (such as a video program receiver) to disable or block trick modes over a corresponding segment or portion of the bitstream in which the flag is effective. When trick modes are blocked over a segment comprising of successive RAPs, the flag may be signaled at each RAP (random access point) over the duration of the segment to maintain its persistence. Each respective portion or segment where trick modes are disabled or blocked may be processed only in normal playback mode by the application or processing device. In some embodiments, trick modes are disabled for certain commercials or advertisements, such as for particular commercial or adverts that have such rights (e.g., commercial provider paid a certain fee to an operator or broadcaster for such rights). As an example, the flag pvr_assist_block_trick_mode_present_flag may signal the presence of a blocking trick modes signal.

In some embodiments, a PES (packetized elementary stream) packet, as specified in MPEG-2 Transport, may be constrained to contain no more than one video access unit (AU) start, where AU is as specified in the HEVC specification referenced above. That is, the constraint is that there be no more than one video access unit (AU) start per PES packet, such that each PES packet shall contain exactly one AU. In other embodiments, the first payload byte after the PES header shall be the start of the AU. The "data_alignment_indicator" in the PES header may then be set to a value of "1".

To facilitate random access periodically without introducing excessive channel change time in TV networks, the maximum time interval between successive RAP pictures may be less than or equal to a certain amount of time, such as close to a 1.0 second with a plus delta of time to facilitate scene change adjustments in video coding or efficient video coding with GOP (group of pictures) structures that are powers of two or multiples of two.

In embodiments, a RAP access unit may include exactly one VPS, one Sequence Parameter Set (SPS) (that is active) with VUI, and at least one Picture Parameter Set (PPS) that is required for decoding the associated picture. The SPS may precede any SEI NAL units that may be present in the RAP access unit.

In embodiments, any prefix SEI NAL units (as specified in the HEVC specification) associated with an access unit (AU) may precede in the AU the NAL unit corresponding to the first coded slice of the AU. Furthermore, any suffix SEI NAL units (as specified in the HEVC specification) associated with the access unit (AU) may precede in the AU the NAL unit corresponding to the last coded slice of the AU.

A RAP picture associated with a RAP of the bistream shall correspond to IDR, CRA, BLA, where IDR, CRA, BLA are as specified by the HEVC specification. All the VCL NAL units of a RAP picture have the same nal_unit_type. The RAP picture associated with a picture in the bitstream (i.e., the picture's associated RAP picture) is the closest prior RAP picture in the bitstream (i.e., the prior RAP in decode order).

When decoding of an HEVC bitstream starts at a RAP picture that is a BLA picture with NAL unit type equal to BLA_W_LP or a CRA picture with NAL unit type equal to CRA_NUT, any picture that immediately follows the RAP picture that is a RASL pictures is not decodable by the HEVC decoder as a RASL picture may contain references to pictures that are not present in the bitstream (i.e., references to pictures that were in the bitstream prior to its associated RAP picture). Thus, when the decoding of an HEVC bitstream starts at a RAP picture that is a BLA picture with NAL unit type equal to BLA_W_LP or a CRA picture with NAL unit type equal to CRA_NUT, RASL pictures associated with the RAP picture are not decodable.

In some embodiments, when decoding of an HEVC bitstream starts at a RAP picture with NAL unit type equal to CRA_NUT, the value of the variable HandleCraAsBlaFlag shall be equal to 1 and the variable NoRaslOutputFlag shall be set equal to HandleCraAsBlaFlag. Information related to a tier framework may describe signaling for extractable and decodable sub-sequences based on pictures interdependencies. This allows the PVR application to efficiently select pictures when performing a given trick-mode.

According to present embodiments, a hierarchy of data dependency tiers contains at most N tiers. In one embodiment, N=7. The tiers may be ordered hierarchically from "0" to "7" (or in a different embodiment, 0 to 7) based on their decodability so that any picture with a particular tier number does not depend directly or indirectly on any picture with a higher tier number.

Each picture in the video stream may belong to one of the N tiers, such as N=8. For any value of k=0, . . . 7, any picture in the kth tier shall not depend directly or indirectly on the processing or decoding of any picture in the (k+1)th tier or above. This implies that a picture that depends on a reference picture cannot have a tier number smaller than the tier number of the reference picture.

Lowest Tier number may consist of the first level of picture extractability, and each subsequent tier may correspond to the next level of picture extractability in the video stream. All RAP pictures shall belong to Tier 0 and all Tier 0 pictures shall be RAP pictures. A certain tier, such as Tier 5 in one embodiment, may be assigned to the largest tier number that may be assigned to reference pictures that are intended to be extracted for trick modes. The tiers above the certain tier, such as in this case, Tiers 6 and 7, correspond to the last level of picture extractability and correspond to pictures deemed discardable, which are pictures that are not used as reference pictures. In this example, Tiers 6 and 7 pictures are intended to be discardable for trick-mode purposes and do not depend on other Tier 6 and 7 pictures. For HEVC bitstreams, all pictures that are not reference pictures may belong to Tier 7 in one embodiment. In an alternate embodiment, all pictures that are not reference pictures may belong to Tier 7 or Tier 6.

When video decoding of an HEVC bitstream starts at a RAP, starting from a RAP picture and including the RAP picture, for any value of k=0, . . . 7, except for Tier k picture that is a RASL picture, a Tier k picture associated with the RAP picture is decodable if all immediately-preceding Tier 0 through Tier k pictures, inclusive, in the video stream have been decoded. Specifically, when video decoding of an HEVC bitstream starts at a RAP picture with nal_unit_type equal to BLA_W_LP or CRA_NUT, each of the RASL pictures associated with the RAP picture, if present, are not decodable irrespective of the Tier number associated with the picture.

A RASL picture may have nal_unit_type equal to RASL_R (i.e., be a reference picture) or RASL_N (i.e., not be a reference picture, as specified in the HEVC specification. Irrespective of the Tier number, all RASL picture that are not decodable when video decoding of an HEVC bitstream starts at a RAP picture with nal_unit_type equals to BLA_W_LP or CRA_NUT. If the RAP picture is a CRA, the value of the variable HandleCraAsBlaFlag shall be equal to 1 and the variable NoRaslOutputFlag shall be set equal to HandleCraAsBlaFlag.

Per the HEVC specification, the value of "nuh_temporal_id_plus1 minus 1" in the NAL unit header of each NAL unit in an AU specifies a temporal identifier for the NAL unit. The value of nuh_temporal_id_plus1 shall not be equal to 0.

The TemporalId of a picture is derived as follows: TemporalId=nuh_temporal_id_plus1−1. The TemporalId of all RAP pictures shall be equal to 0. However, a picture that is not a RAP picture may also have TemporalId equal to 0. The maximum TemporalId value that a picture can have may be equal to the value sps_max_sub_layers_minus1 provided in the active SPS, per the HEVC specification.

According to embodiments of the present disclosure, all the tier numbers corresponding to a picture and specified in its corresponding transport packet, shall accord to the following: 1) All IRAP pictures shall have tier equal to the lowest tier number (e.g., 0 in one embodiment, or 1 in an alternate embodiment); 2) All pictures with a TemporalId value equal to 0 that are not RAP pictures shall have a tier value equal to one more than the tier number corresponding to the RAP pictures; 3) All pictures with with TemporalId to a value greater than 0 that are reference pictures shall have a tier value equal to TemporalId plus 1. In some embodiment, all pictures with TemporalId equal to sps_max_sub_layers_minus1 that are not reference pictures shall have a tier value equal to 7.

According to embodiments, the tier number corresponding to a picture shall accord to the following: 1) All IRAP pictures shall have tier equal 0—All pictures with a TemporalId=0 that are not RAP pictures have a tier=1; 2) All pictures with with TemporalId>0 that are reference pictures shall have tier=TemporalId+1; and 3) All pictures with with TemporalId=sps_max_sub_layers_minus1 that are not reference pictures shall have a tier=7.

FIG. 1 is a high-level block diagram depicting an example environment in which one or more embodiments of a video processing (VP) system are implemented. In particular, FIG. 1 is a block diagram that depicts an example subscriber television system (STS) 100. In this example, the STS 100 includes a headend 110 and one or more video stream receive-and-process (VSRP) devices 200. In some embodiments, one of the VSRP devices 200 may be equipped with functionality to process assistance information that affects proper trick mode functionality.

According to embodiments of the present disclosure, an HEVC receiver, such as VSRP device 200, may have at least the following non-limiting attributes: 1) Able to parse and decode the normative elements from HEVC that are specified with constraints in this standard; 2) Not adversely affected by the presence or absence of optional and informative elements from HEVC; 3) Able to parse and process all elements (including optional elements) from HEVC Annex D (SEI messages) and Annex E (VUI syntax elements) that are normatively specified and/or constrained by this standard and conveyed in-band; 4) Not adversely affected by the presence or absence of optional elements from ISO/IEC 13818-1 (such as data in adaptation fields) that are specified with constraints in this standard; 5) Supports the processing of end_of_bitstream_rbsp( ) syntax element required by applications where another bitstream follows the end_of_bitstream NAL unit. The bitstream that follows may start with an IDR picture (NAL unit type=20, IDR_N_LP) and may be accompanied by a time base discontinuity. Management of DPB frame buffers in accordance with the HEVC Specification supports graceful output transitions between fields and frames at an SHRAP containing an IDR or BLA picture; and 6) Supports the processing of elementary streams in Low Delay Mode and Still Pictures.

The VSRP devices 200 and the headend 110 are coupled via a network 130. The headend 110 and the VSRP devices 200 cooperate to provide a user with television services, including, for example, broadcast television programming, interactive program guide (IPG) services, VOD services, PVR services, DVR services, and pay-per-view, as well as other digital services such as music, Internet access, commerce (e.g., home-shopping), voice-over-IP (VOIP), and/or other telephone or data services.

The VSRP device 200 is typically situated at a user's residence or place of business and may be a stand-alone unit or integrated into another device such as, for example, the display device 140, a personal computer, personal digital assistant (PDA), mobile phone, among other devices. In other words, the VSRP device 200 (also referred to herein as a digital receiver or processing device or digital home communications terminal (DHCT)) may comprise one of many devices or a combination of devices, such as a set-top box, television with communication capabilities, cellular phone, personal digital assistant (PDA), or other computer or computer-based device or system, such as a laptop, personal computer, DVD/CD recorder, among others. As set forth above, the VSRP device 200 may be coupled to the display device 140 (e.g., computer monitor, television set, etc.), or in some embodiments, may comprise an integrated display (with or without an integrated audio component).

The VSRP device 200 receives signals (video, audio and/or other data) including, for example, digital video signals in a compressed representation of a digitized video signal such as, for example, a coded video sequence ("CVS") modulated on a carrier signal, and/or analog information modulated on a carrier signal, among others, from the headend 110 through the network 130, and provides reverse information to the headend 110 through the network 130.

Television services may be presented via respective display devices 140, each which typically comprises a television set. However, the display devices 140 may also be any other device capable of displaying the sequence of pictures of a video signal including, for example, a computer monitor, a mobile phone, game device, etc. In one implementation, the display device 140 is configured with an audio component (e.g., speakers), whereas in some implementations, audio functionality may be provided by a device that is separate yet communicatively coupled to the display device 140 and/or VSRP device 200. Although shown communicating with a display device 140, the VSRP device 200 may communicate with other devices that receive, store, and/or process bitstreams from the VSRP device 200, or that provide or transmit bitstreams or uncompressed video signals to the VSRP device 200.

The network 130 may comprise a single network, or a combination of networks (e.g., local and/or wide area networks). Further, the communications medium of the network 130 may comprise a wired connection or wireless connection (e.g., satellite, terrestrial, wireless LAN, etc.), or a combination of both. In the case of wired implementations, the network 130 may comprise a hybrid-fiber coaxial (HFC) medium, coaxial, optical, twisted pair, etc. Other networks are contemplated to be within the scope of the disclosure, including networks that use packets incorporated with and/or are compliant to MPEG-2 transport with HEVC coding or other transport layers or coding protocols.

The headend 110 may include one or more server devices (not shown) for providing video, audio, and other types of media or data to client devices such as, for example, the VSRP device 200. The headend 110 may receive content from sources external to the headend 110 or STS 100 via a wired and/or wireless connection (e.g., satellite or terrestrial network), such as from content providers, and in some embodiments, may receive package-selected national or regional content with local programming (e.g., including local advertising) for delivery to subscribers. The headend 110 also includes one or more encoders (encoding devices or compression engines) 111 (one shown) and one or more video processing devices embodied as one or more splicers 112 (one shown) coupled to the encoder 111. In some embodiments, the encoder 111 and splicer 112 may be co-located in the same device and/or in the same locale (e.g., both in the headend 110 or elsewhere), while in some embodiments, the encoder 111 and splicer 112 may be distributed among different locations within the STS 100. For instance, though shown residing at the headend 110, the encoder 111 and/or splicer 112 may reside in some embodiments at other locations such as a hub or node. The encoder 111 and splicer 112 are coupled with suitable signaling or provisioned to respond to signaling for portions of a video service where commercials are to be inserted.

The encoder 111 provides a compressed bitstream (e.g., in a transport stream) to the splicer 112 while both receive signals or cues that pertain to splicing or digital program insertion. In some embodiments, the encoder 111 does not receive these signals or cues. In one embodiment, the encoder 111 and/or splicer 112 are further configured to provide assistance information corresponding tier numbers and other information in the bitstream to convey to the VSRP devices 200 instructions corresponding to affect extraction of pictures for trick mode operation as previously described.

Further, the splicer 112 may pass the assistance information provided by the encoder 111, with or without modification, to the VSRP device 200, or the encoder 111 may provide the assistance information directly (bypassing the splicer 112) to the VSRP device 200.

The STS 100 may comprise an IPTV network, a cable television network, a satellite television network, a subscriber network, or a combination of two or more of these networks or other networks. Further, network PVR and switched digital video are also considered within the scope of the disclosure. Although described in the context of video processing, it should be understood that certain embodiments of the VP systems described herein also include functionality for the processing of other media content such as compressed audio streams.

The STS 100 comprises additional components and/or facilities not shown, as should be understood by one having ordinary skill in the art. For instance, the STS 100 may comprise one or more additional servers (Internet Service Provider (ISP) facility servers, private servers, on-demand servers, channel change servers, multi-media messaging servers, program guide servers), modulators (e.g., QAM, QPSK, etc.), routers, bridges, gateways, multiplexers, transmitters, and/or switches (e.g., at the network edge, among other locations) that process and deliver and/or forward (e.g., route) various digital services to subscribers.

In one embodiment, the VP system comprises the headend 110 and one or more of the VSRP devices 200. In some embodiments, the VP system comprises portions of each of these components, or in some embodiments, one of these components or a subset thereof. In some embodiments, one or more additional components described above yet not shown in FIG. 1 may be incorporated in a VP system, as should be understood by one having ordinary skill in the art in the context of the present disclosure.

Figure 2:
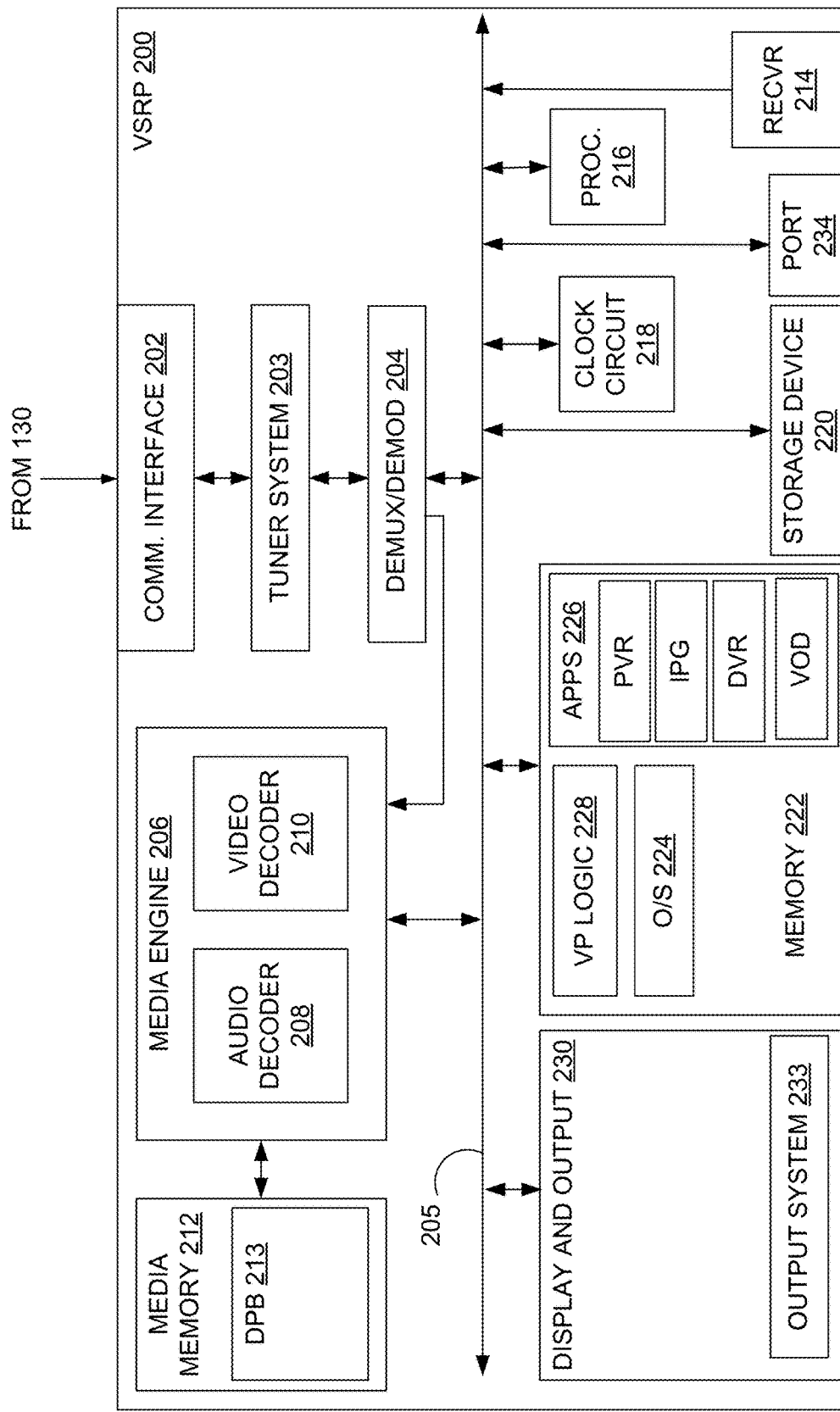
FIG. 2 is a block diagram of an example embodiment of a video stream receive-and-process (VSRP) device comprising an embodiment of a VP system.

FIG. 2 is an example embodiment of select components of a VSRP device 200. It should be understood by one having ordinary skill in the art that the VSRP device 200 shown in FIG. 2 is merely illustrative, and should not be construed as implying any limitations upon the scope of the disclosure. In one embodiment, a VP system may comprise all components shown in, or described in association with, the VSRP device

200 of FIG. 2. In some embodiments, a VP system may comprise fewer components, such as those limited to facilitating and implementing the decoding of compressed bitstreams and/or output pictures corresponding to decoded versions of coded pictures in the bitstream. In some embodiments, functionality of the VP system may be distributed among the VSRP device 200 and one or more additional devices as mentioned above.

The VSRP device 200 includes a communication interface 202 (e.g., depending on the implementation, suitable for coupling to the Internet, a coaxial cable network, an HFC network, satellite network, terrestrial network, cellular network, etc.) coupled in one embodiment to a tuner system 203. The tuner system 203 includes one or more tuners for receiving downloaded (or transmitted) media content. The tuner system 203 can select from a plurality of transmission signals provided by the STS 100 (FIG. 1). The tuner system 203 enables the VSRP device 200 to tune to downstream media and data transmissions, thereby allowing a user to receive digital media content via the STS 100. The tuner system 203 includes, in one implementation, an out-of-band tuner for bi-directional data communication and one or more tuners (in-band) for receiving television signals. In some embodiments (e.g., IPTV-configured VSRP devices), the tuner system may be omitted.

The tuner system 203 is coupled to a demultiplexing/demodulation system 204 (herein, simply demux 204 for brevity). The demux 204 may include MPEG-2 transport demultiplexing capabilities. When tuned to carrier frequencies carrying a digital transmission signal, the demux 204 enables the separation of packets of data, corresponding to the desired video stream, for further processing. Concurrently, the demux 204 precludes further processing of packets in the multiplexed transport stream that are irrelevant or not desired, such as packets of data corresponding to other bitstreams. Parsing capabilities of the demux 204 allow for the ingesting by the VSRP device 200 of program associated information carried in the bitstream. The demux 204 is configured to identify and extract information in the bitstream, such as assistance information, to facilitate the identification, extraction, and processing of the coded pictures. Other such information includes Program Specific Information (PSI) (e.g., Program Map Table (PMT), Program Association Table (PAT), etc.) and parameters or syntactic elements (e.g., Program Clock Reference (PCR), time stamp information, payload_unit_start_indicator, etc.) of the transport stream (including packetized elementary stream (PES) packet information).

In one embodiment, additional information extracted by the demux 204 includes the aforementioned assistance information pertaining to the bitstream that assists the decoding logic (in cooperation with the processor 216 executing code of the VP logic 228 to affect certain behavior to provide the requested trick mode, wherein the assistance information pertains to picture interdependencies related by successive tier numbers, and in some embodiments, further assists display and output logic 230 (in cooperation with the processor 216 executing code of the VP logic 228) in processing reconstructed pictures for display and/or output.

The demux 204 is coupled to a bus 205 and to a media engine 206. The media engine 206 comprises, in one embodiment, decoding logic comprising one or more of a respective audio decoder 208 and video decoder 210. The media engine 206 is further coupled to the bus 205 and to media memory 212, the latter which, in one embodiment, comprises one or more respective buffers for temporarily storing compressed (compressed picture buffer or bit buffer, not shown) and/or reconstructed pictures (decoded picture buffer or DPB 213). In some embodiments, one or more of the buffers of the media memory 212 may reside in other memory (e.g., memory 222, explained below) or components.

The VSRP device 200 further comprises additional components coupled to the bus 205 (though shown as a single bus, one or more buses are contemplated to be within the scope of the embodiments). For instance, the VSRP device 200 further comprises a receiver 214 (e.g., infrared (IR), radio frequency (RF), etc.) configured to receive user input (e.g., via direct-physical or wireless connection via a keyboard, remote control, voice activation, etc.) to convey a user's request or command (e.g., for program selection, trick mode manipulation such as fast forward, rewind, pause, channel change, one or more processors (one shown) 216 for controlling operations of the VSRP device 200, and a clock circuit 218 comprising phase and/or frequency locked-loop circuitry to lock into a system time clock (STC) from a program clock reference, or PCR, received in the bitstream to facilitate decoding and output operations. Although described in the context of hardware circuitry, some embodiments of the clock circuit 218 may be configured as software (e.g., virtual clocks) or a combination of hardware and software. Further, in some embodiments, the clock circuit 218 is programmable.

The VSRP device 200 may further comprise a storage device 220 (and associated control logic as well as one or more drivers in memory 222) to temporarily store buffered media content and/or more permanently store recorded media content. The storage device 220 may be coupled to the bus 205 via an appropriate interface (not shown), as should be understood by one having ordinary skill in the art.

Memory 222 in the VSRP device 200 comprises volatile and/or non-volatile memory, and is configured to store executable instructions or code associated with an operating system (O/S) 224 and other applications, and one or more applications 226 (e.g., interactive programming guide (IPG), video-on-demand (VOD), personal video recording (PVR), WatchTV (associated with broadcast network TV), among other applications not shown such as pay-per-view, music, driver software, etc.).

Further included in one embodiment in memory 222 is video processing (VP) logic 228, which in one embodiment is configured in software. In some embodiments, VP logic 228 may be configured in hardware, or a combination of hardware and software. The VP logic 228, in cooperation with the processor 216, is responsible for interpreting assistance information and providing the appropriate settings for a display and output system 230 of the VSRP device 200. In some embodiments, functionality of the VP logic 228 may reside in another component within or external to memory 222 or be distributed among multiple components of the VSRP device 200 in some embodiments.

The VSRP device 200 is further configured with the display and output logic 230, as indicated above, which includes one or more output systems (e.g., configured as HDMI, DENC, or others well-known to those having ordinary skill in the art) 233 to process the decoded pictures and provide for presentation (e.g., display) on display device 140. Though shown conceptually in FIG. 2 as an entity separate from the media engine 206, in some embodiments, one or more of the functionality of the display and output logic 230 may be incorporated in the media engine 206 (e.g., on a single chip) or elsewhere in some embodiments.

A communications port 234 (or ports) is (are) further included in the VSRP device 200 for receiving information from and transmitting information to other devices. For instance, the communication port 234 may feature USB (Universal Serial Bus), Ethernet, IEEE-1394, serial, and/or parallel ports, etc. The VSRP device 200 may also include one or more analog video input ports for receiving and/or transmitting analog video signals.

One having ordinary skill in the art should understand that the VSRP device 200 may include other components not shown, including decryptors, samplers, digitizers (e.g., analog-to-digital converters), multiplexers, conditional access processor and/or application software, driver software, Internet browser, among others. Further, though the VP logic 228 is illustrated as residing in memory 222, it should be understood that all or a portion of such logic 228 may be incorporated in, or distributed among, the media engine 206, the display and output system 230, or elsewhere. Similarly, in some embodiments, functionality for one or more of the components illustrated in, or described in association with, FIG. 2 may be combined with another component into a single integrated component or device.

The VP system (e.g., encoder 111, splicer 112, decoding logic (e.g., media engine 206), and/or display and output logic 230) may be implemented in hardware, software, firmware, or a combination thereof. To the extent certain embodiments of the VP system or a portion thereof are implemented in software or firmware (e.g., including the VP logic 228), executable instructions for performing one or more tasks of the VP system are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the VP system or portions thereof are implemented in hardware, the VP system may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Having addressed certain embodiments of VP systems that decode the coded pictures of a bitstream, attention is directed to the use of the assistance information (or a separate and distinct piece of assistance information in some embodiments) to assist the affecting of trick mode functionality. An output clock (e.g., a clock residing in the clocking circuit 218 or elsewhere) residing in the VSRP device 200 drives the output of reconstructed pictures (e.g., with an output system 233 configured as HDMI or a DENC or other known output systems). The display and output logic 230 may operate in one of plural modes. In one mode, often referred to as passthrough mode, the VSRP device 200 behaves intelligently, providing an output picture format corresponding to the picture format determined upon the acquisition or start of a video service (such as upon a channel change) in union with the format capabilities of the display device 140 and user preferences. In a fixed mode (or also referred to herein as a non-passthrough mode), the output picture format is fixed by user input or automatically (e.g., without user input) based on what the display device 140 supports (e.g., based on interrogation by the set-top box of display device picture format capabilities).

In one embodiment, the splicer 112 and/or encoder 111 deliver assistance information for reception and processing by the display and output logic 230, the assistance information conveying to the display and output logic 230 information to affect certain behavior to provide the requested trick mode, wherein the assistance information pertains to picture interdependencies related by successive tier numbers output of the decoded pictures. In some embodiments a part of the assistance information may be provided according to a different mechanism or via a different channel or medium.

Figure 3:
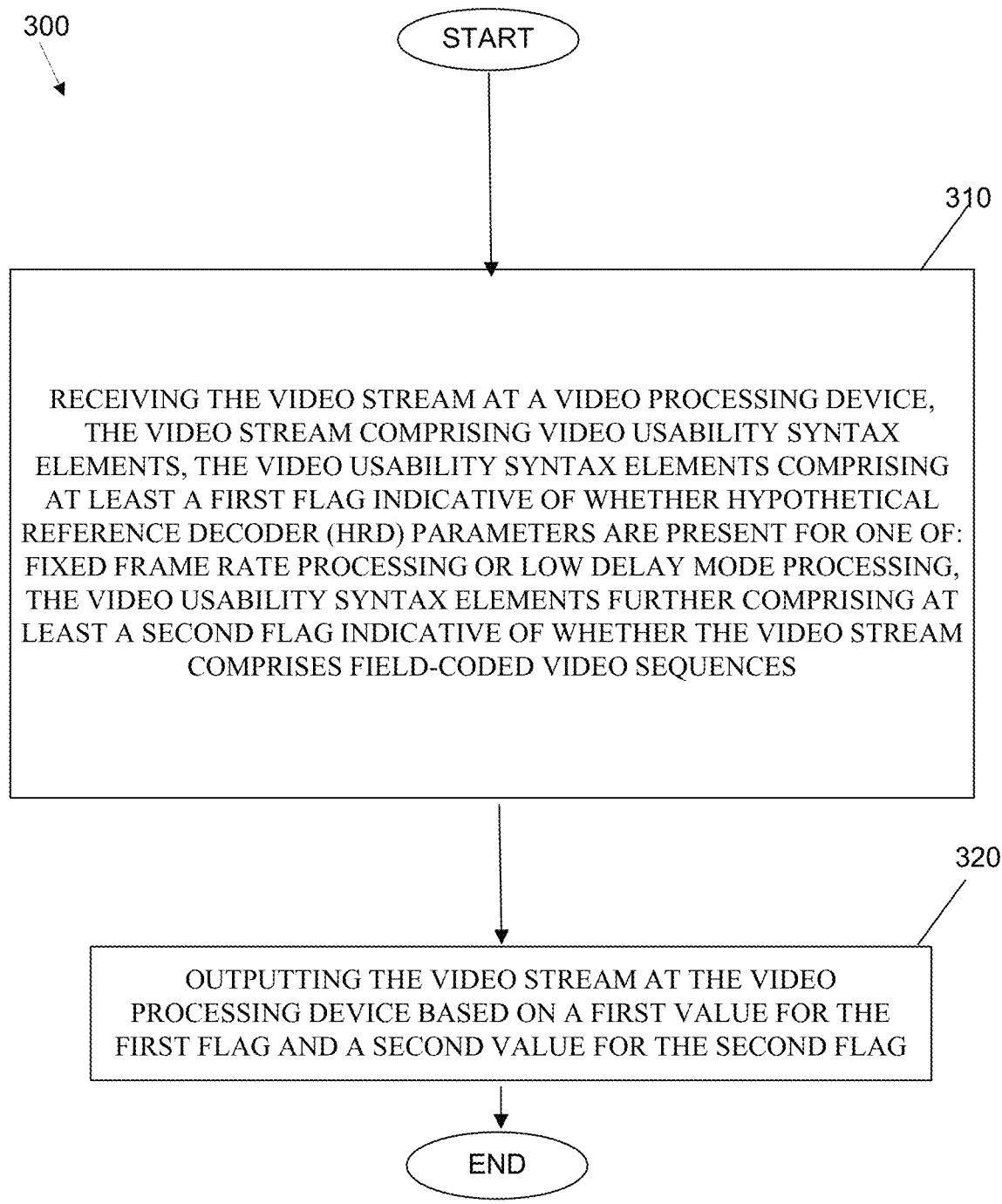
FIG. 3 is a flow diagram that illustrates one example method embodiment to process video comprising assistance information.

FIG. 3 is a flowchart illustrating processing a video stream according to embodiments of the present disclosure. Method 300 may start at step 310. At step 310, a video processing device may receive the video stream. The video stream may comprise video usability syntax elements. For example, the video usability syntax elements may comprise at least a first flag indicative of whether Hypothetical Reference Decoder (HRD) parameters are present for one of: fixed frame rate processing or low delay mode processing.

A first value of the first flag may require employing HRD parameter constraints for low delay mode. The video usability syntax elements may further comprise at least a second flag indicative of whether the video stream comprises field-coded video sequences. Low delay mode processing may require that all pictures in the video stream are one of: intra-coded pictures or forward predicted pictures (FPPs). In some embodiments, low delay mode processing may require that all pictures in the video stream comprise a presentation time stamp (PTS) equal to or inferred as equal to each picture's respective decoding time stamp (DTS). Low delay mode may also require that all pictures in the video stream comprise a PTS greater than an immediately prior picture. Similarly, low delay mode may further require that each decoded picture in the video stream is output repeatedly until a next decoded picture is available. In some embodiments, a coded picture buffer may underflow during low delay mode.

In some embodiments of the present disclosure, each picture's respective DTS may not present in a packetized elementary stream (PES) packet header. In some embodiments of the present disclosure, a value for a third flag may be inferred. The inferred value may be indicative of a fixed picture rate based on the first value of the first flag. Method 300 may then proceed to step 320. At step 320 the video stream may be output at the video processing device based on a first value for the first flag and a second value for the second flag.

Figure 4:
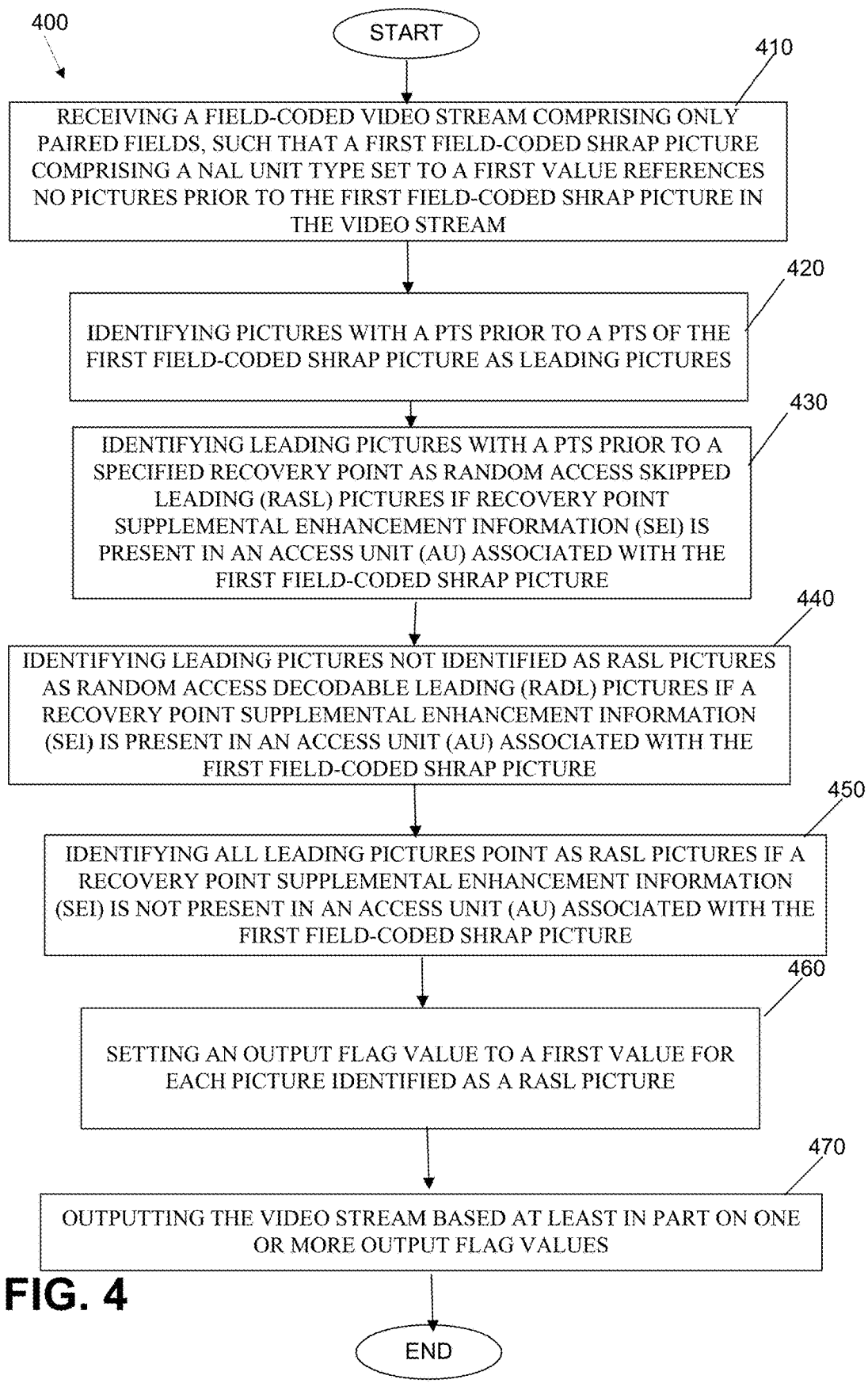
FIG. 4 is a flow diagram that illustrates one example method embodiment to process video comprising assistance information.

FIG. 4 is a flowchart illustrating processing a video stream according to embodiments of the present disclosure. Method 400 may start at step 410. At step 410, a field-coded video stream comprising only paired fields may be received by a video processing device. In some embodiments, the field-coded video stream may be comprised such that a first field-coded SHRAP picture comprising a NAL unit type set to a first value, for example TRAIL_R, has a paired field that references no pictures prior to the first field-coded SHRAP picture in the video stream. Method 400 may then proceed to step 420 where pictures with a PTS prior to a PTS of the first field-coded SHRAP picture may be identified as leading pictures. In some embodiments, the NAL unit type may correspond to TRAIL_R.

Method 400 may then proceed to step 430. At step 430, leading pictures with a PTS prior to a specified recovery point may be identified as random access skipped leading (RASL) pictures if recovery point supplemental enhancement information (SEI) is present in an access unit (AU) associated with the first field-coded SHRAP picture. Next, method 400 may proceed to step 440 where leading pictures not identified as RASL pictures may be identified as random access decodable leading (RADL) pictures if a recovery point supplemental enhancement information (SEI) is present in an access unit (AU) associated with the first field-coded SHRAP picture.

Method 400 may then proceed to step 450. At step 450, all leading pictures point may be identified as RASL pictures if a recovery point supplemental enhancement information (SEI) is not present in an access unit (AU) associated with the first field-coded SHRAP picture. Next, method 400 may proceed to step 460 where an output flag value may be set to a first value for each picture identified as a RASL picture. Finally, at step 470, the video stream may be output based at least in part on one or more output flag values.

Figure 5:
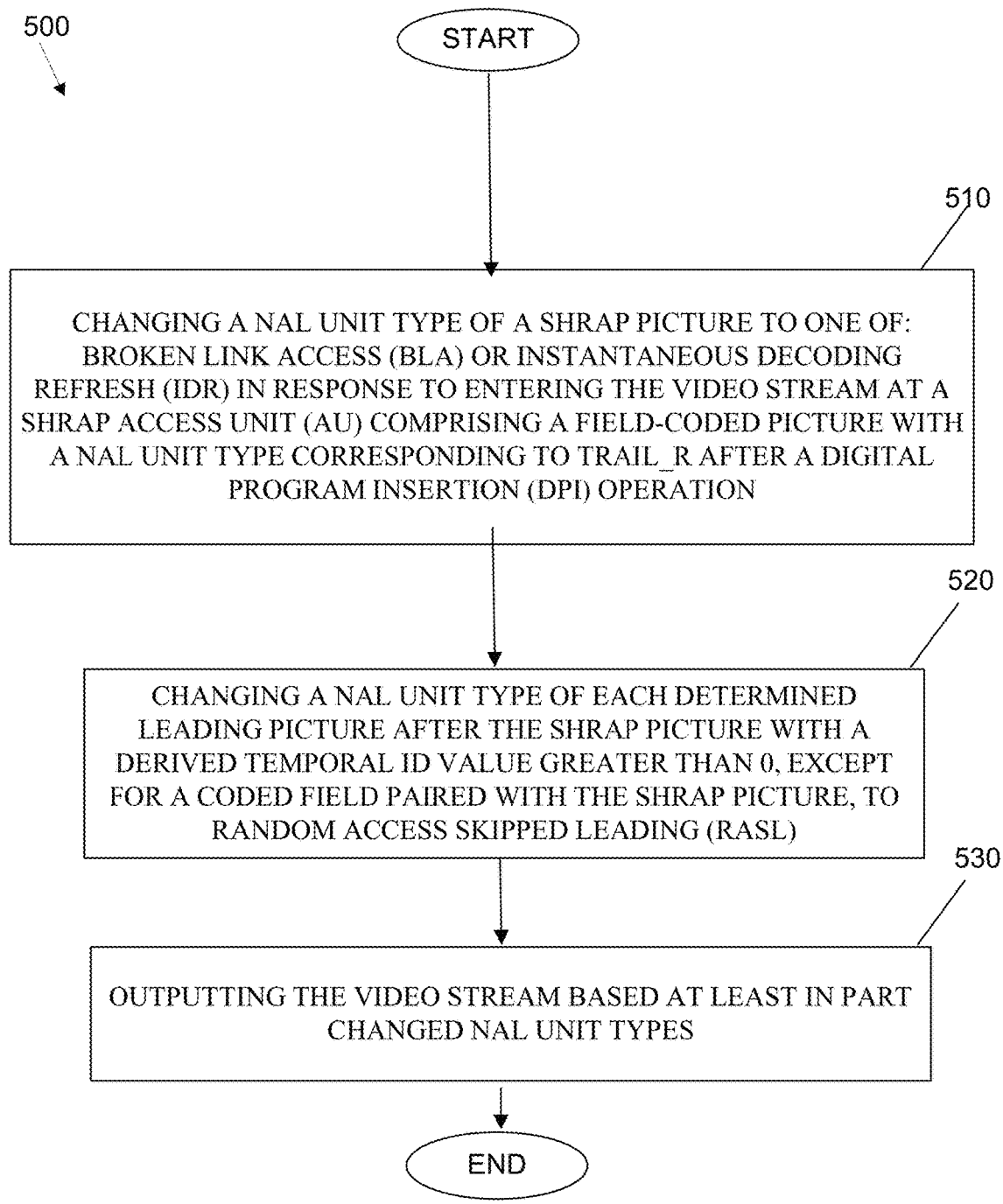
FIG. 5 is a flow diagram that illustrates one example method embodiment to process video comprising assistance information.

FIG. 5 is a flowchart illustrating processing a video stream according to embodiments of the present disclosure. Method 500 may start at step 510. At step 510, a NAL unit type of a SHRAP picture may be changed to one of: Broken Link Access (BLA) or Instantaneous Decoding Refresh (IDR) in response to entering the video stream at a SHRAP access unit (AU) comprising a field-coded picture with a NAL unit type corresponding to TRAIL_R after a Digital Program Insertion (DPI) operation.

Next, method 500 may proceed to step 520. At step 520, a NAL unit type of each determined leading picture after the SHRAP picture with a derived temporal id value greater than 0, except for a coded field paired with the SHRAP picture, may be changed to random access skipped leading (RASL). Method 500 may then proceed to step 530 where the video stream may be output based at least in part changed NAL unit types.

Figure 6:
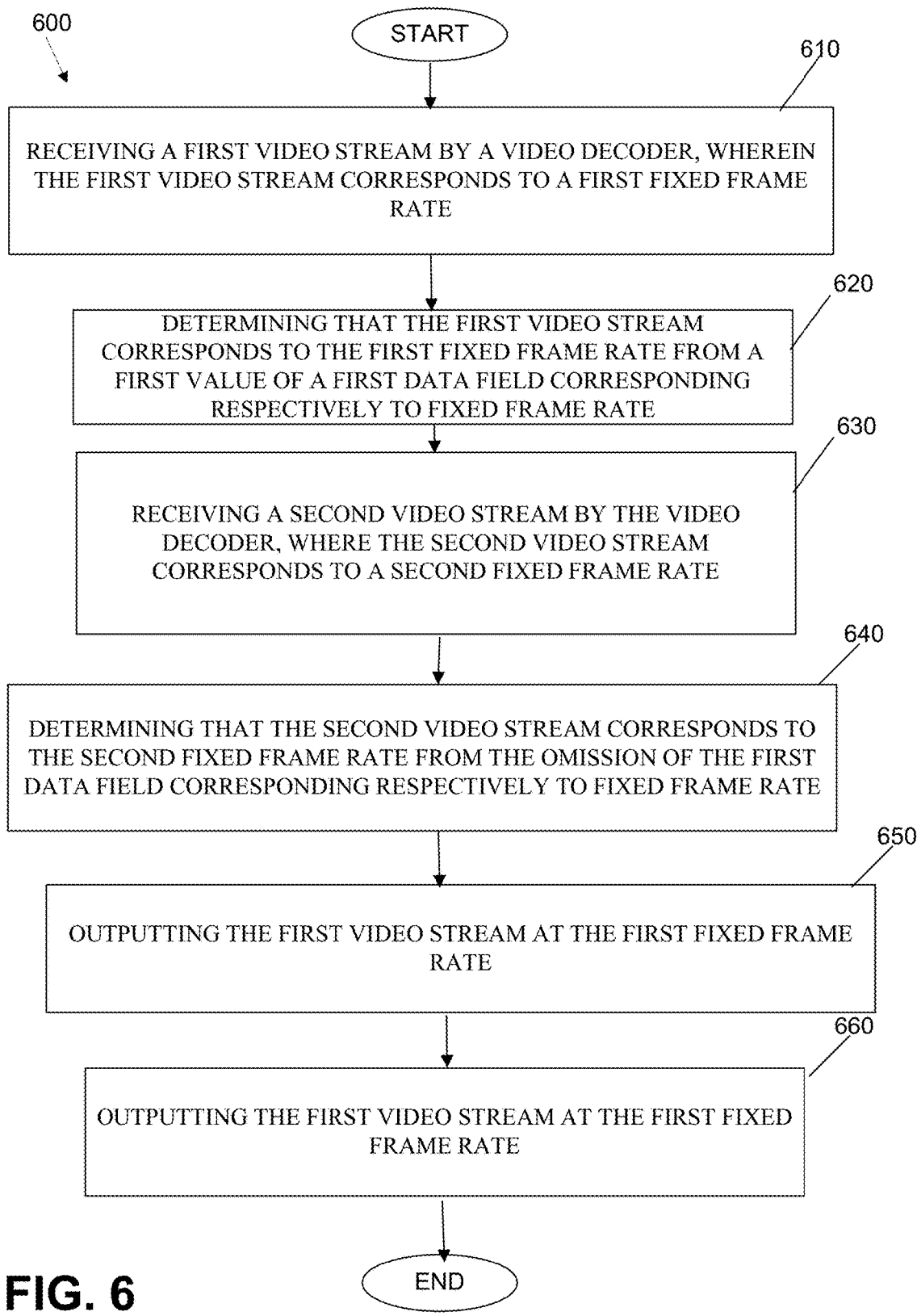
FIG. 6 is a flow diagram that illustrates one example method embodiment to process video comprising assistance information.

FIG. 6 is a flowchart illustrating processing a video stream according to embodiments of the present disclosure. Method 600 may start at step 610. At step 610, a first video stream may be received by a video decoder. In some embodiments, the first video stream may correspond to a first fixed frame rate. Method 600 may then proceed to step 620 where it may be determined that the first video stream corresponds to the first fixed frame rate from a first value of a first data field corresponding respectively to fixed frame rate. In some embodiments of the present disclosure, the first data field may be a flag.

Method 600 may then proceed to step 630. At step 630, a second video stream may be received by the video decoder. Here, the second video stream may correspond to a second fixed frame rate. Method 600 may then proceed to step 640 where it may be determined that the second video stream corresponds to the second fixed frame rate from the omission of the first data field corresponding respectively to fixed frame rate.

Method 600 may then proceed to step 650. At step 650, the first video stream may be output at the first fixed frame rate. Finally, at step 660, the second video stream may be output at the second fixed frame rate. In some embodiments, the first video stream may correspond to a first video coding specification and the second video stream may correspond to a second video coding specification.

In some embodiments of the present disclosure, a third video stream may be received by the video decoder. The video decoder may then determine that the third video stream does not correspond to a fixed frame rate from a second value of the first data field corresponding respectively to fixed frame rate.

Figure 7:
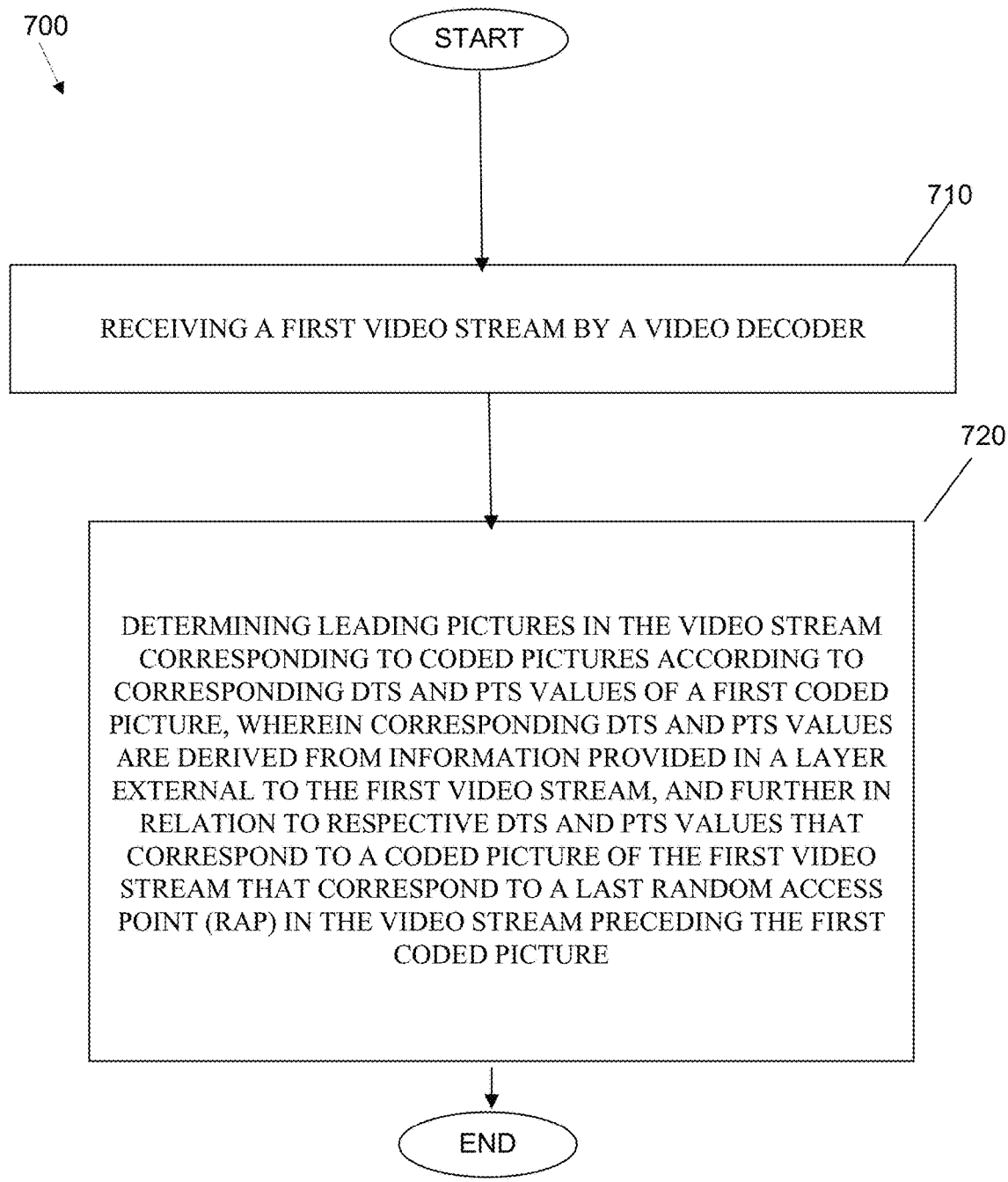
FIG. 7 is a flow diagram that illustrates one example method embodiment to process video comprising assistance information.

FIG. 7 is a flowchart illustrating processing a video stream according to embodiments of the present disclosure. Method 700 may start at step 710. At step 710, a first video stream may be received by a video decoder. Method 700 may then proceed to step 720 where leading pictures in the video stream corresponding to coded pictures may be determined according to corresponding DTS and PTS values of a first coded picture, wherein corresponding DTS and PTS values are derived from information provided in a layer external to the first video stream, and further in relation to respective DTS and PTS values that correspond to a coded picture of the first video stream that correspond to a last random access point (RAP) in the video stream preceding the first coded picture.

In some embodiments, the first coded picture may correspond to a respective field of an interlaced video signal. Furthermore, a DTS of a leading coded picture may correspond to a time later than the DTS of a (RAP) picture and the PTS of the leading coded picture corresponds to a time that is earlier than the PTS of the RAP picture. In some embodiments of the present disclosure, the first video stream does not contain a recovery point (SEI).

Figure 8:
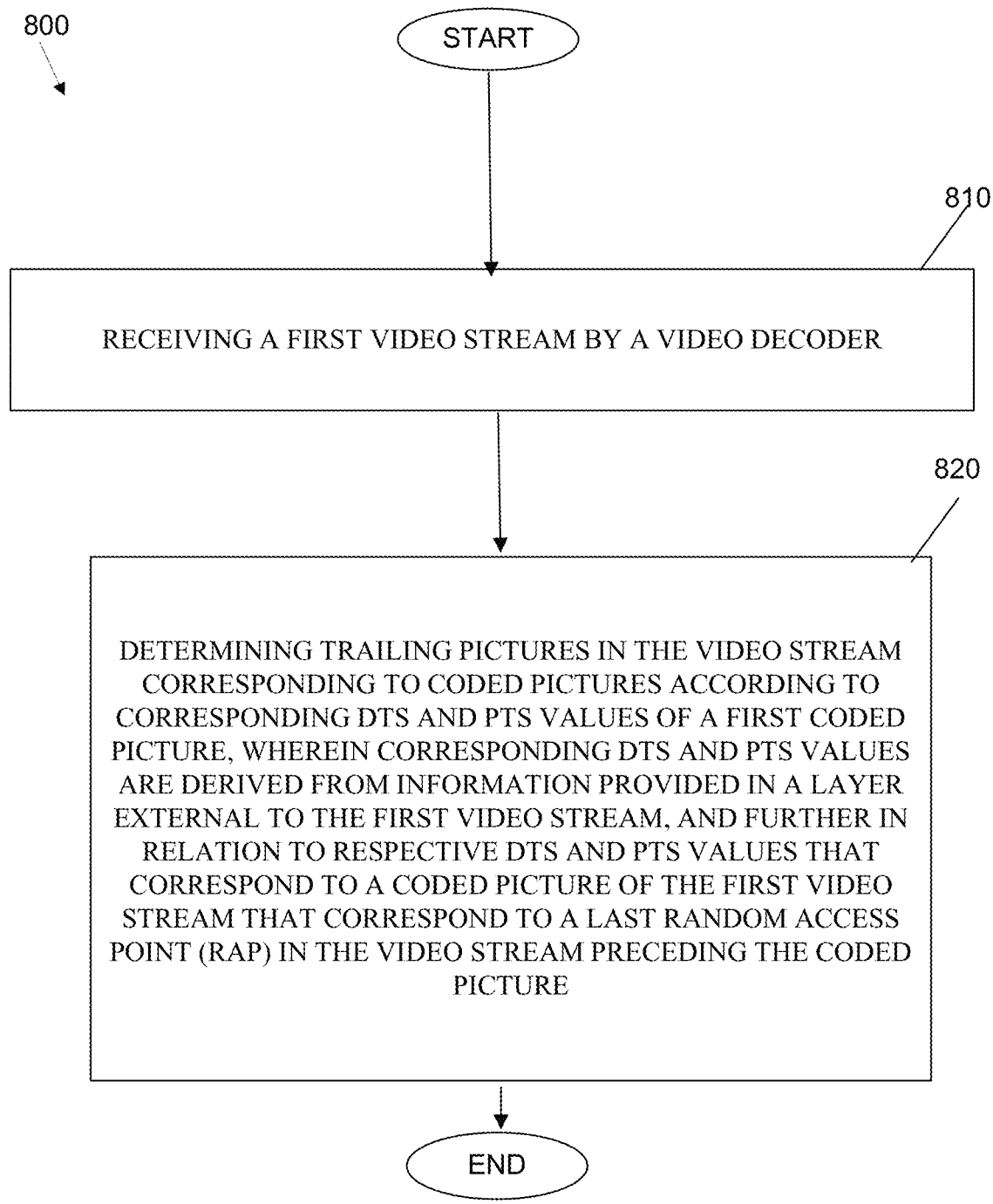
FIG. 8 is a flow diagram that illustrates one example method embodiment to process video comprising assistance information.

FIG. 8 is a flowchart illustrating processing a video stream according to embodiments of the present disclosure. Method 800 may start at step 810. At step 810, a first video stream may be received by a video decoder. Method 800 may then proceed to step 820 where trailing pictures in the video stream corresponding to coded pictures may be determined according to corresponding DTS and PTS values of a first coded picture, wherein corresponding DTS and PTS values are derived from information provided in a layer external to the first video stream, and further in relation to respective DTS and PTS values that correspond to a coded picture of the first video stream that correspond to a last random access point (RAP) in the video stream preceding the coded picture.

In embodiments of the present disclosure, the first coded picture may correspond to a respective field of an interlaced video signal. Furthermore, a DTS of a trailing coded picture may correspond to a time later than the DTS of a (RAP) picture and the PTS of the trailing coded picture corresponds to a time that is later than the PTS of the RAP picture. In some embodiments, the RAP picture has a NAL unit type equal to TRAIL_R. Furthermore, in some embodiments, the first video stream does not contain a recovery point (SEI).

Figure 9:
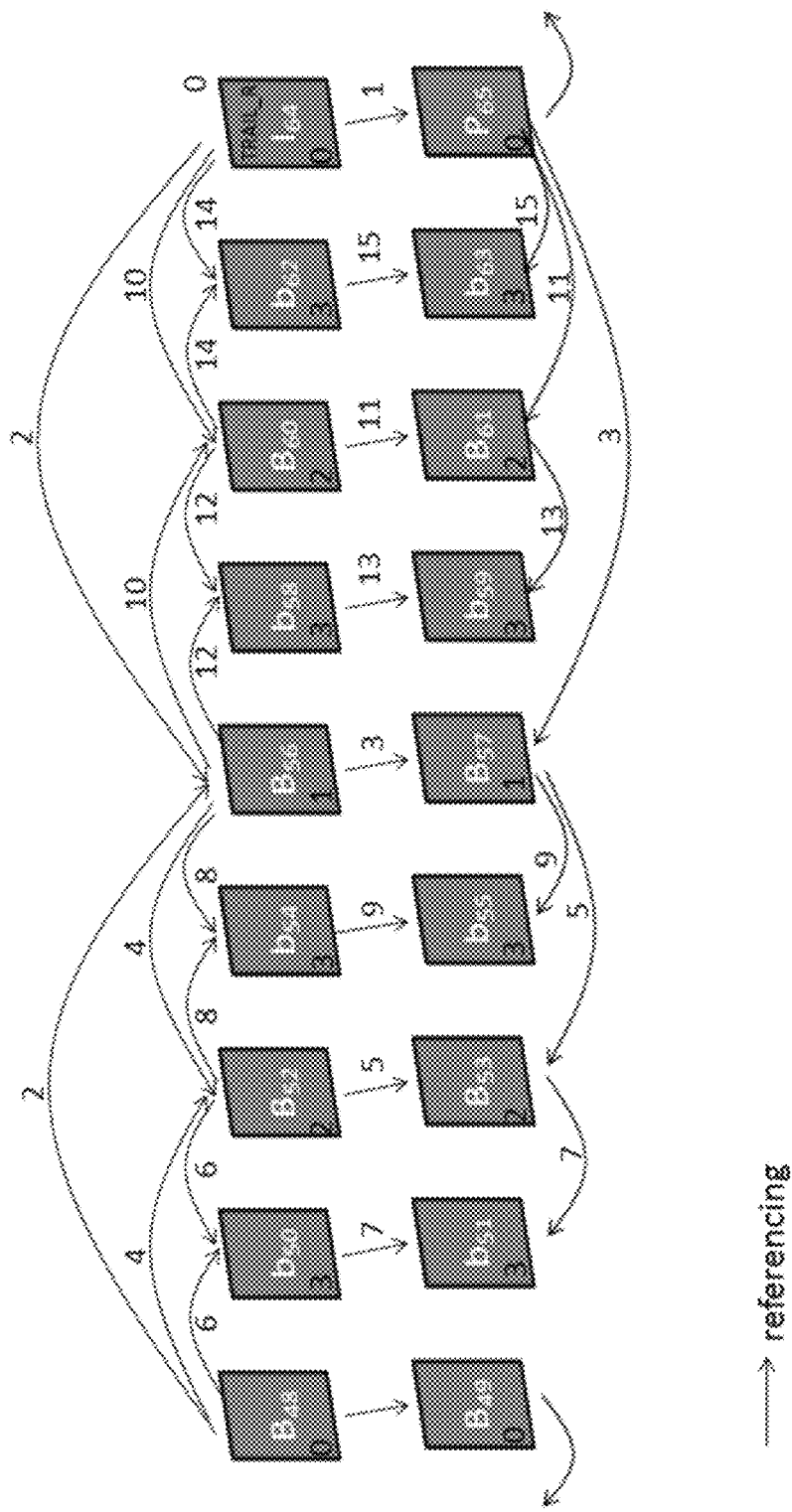
FIG. 9 illustrates a field-coding structure with an I picture with NAL unit equal to TRAIL_R.
Figure 10:
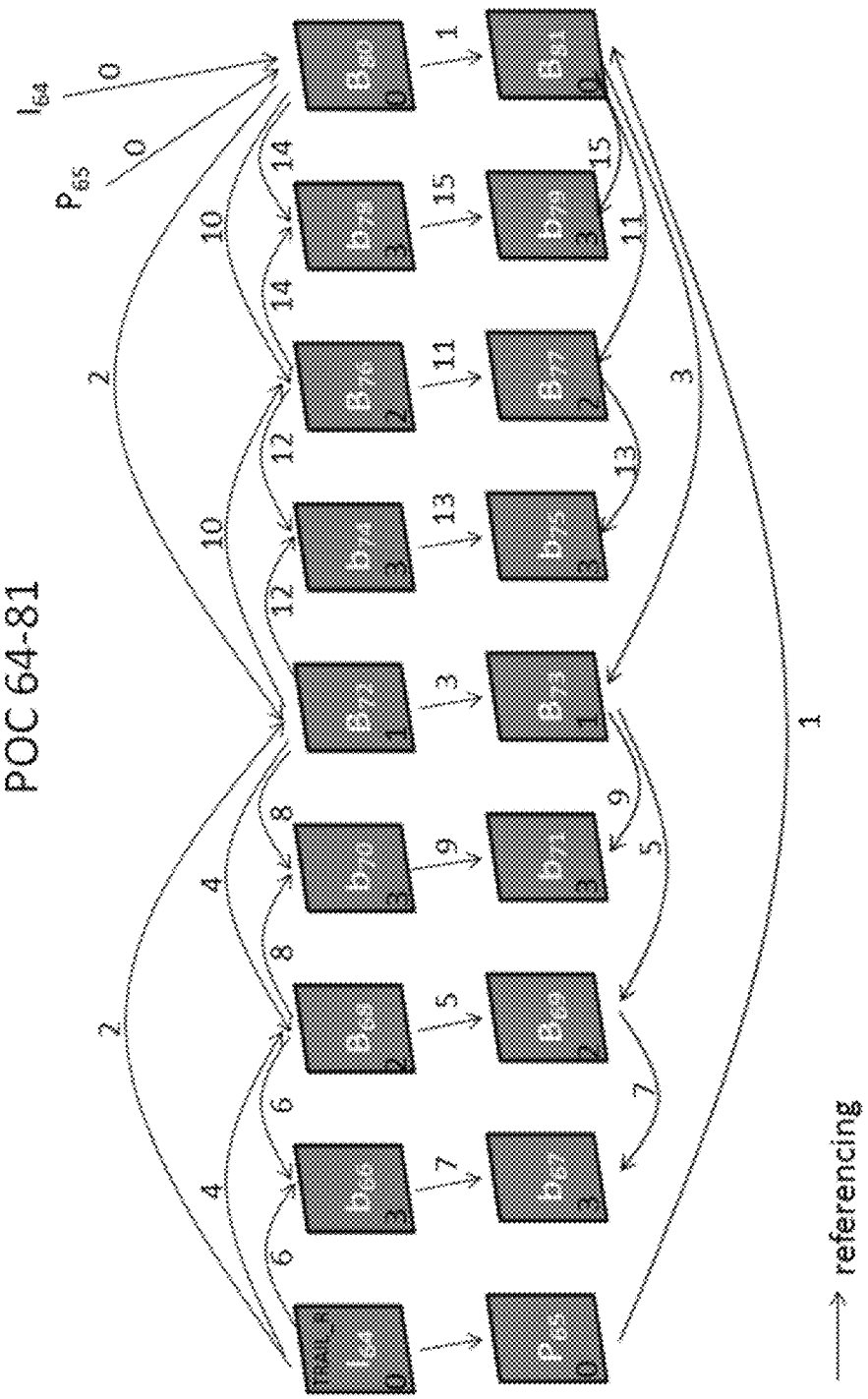
FIG. 10 illustrates a field-coding structure with an I picture with NAL unit equal to TRAIL_R.

FIGS. 9 and 10 illustrate a field-coding structure with an I picture with NAL unit equal to TRAIL_R. Here, I picture 64 has a NAL unit type equal to TRAIL_R. The numbers on the referencing lines indicate the encoding order of the pictures relative to I picture 64. The numbers indicated in the bottom left corner of the pictures indicated the temporal ids for each respective picture.

FIGS. 11 and 12 illustrate a field-coding structure with an I picture with NAL unit equal to CRA. Here, I picture 64 has a NAL unit type equal to CRA. The numbers on the referencing lines indicate the encoding order of the pictures relative to I picture 64. The numbers indicated in the bottom left corner of the pictures indicated the temporal ids for each respective picture.

DVB PVR Assist Structure with Constraints Via Forcing Flags to Zero

Italicized areas show parts of syntax disabled via setting flags to zero; resultant also shown further below.

TABLE 5

PVR_assist_information data field

| Syntax | No. bits | Mnemonic |
|---|---|---|
| PVR_assist_information( ) { | | |
|     data_field_tag | 8 | uimsbf |
|     data_field_length | 8 | uimsbf |
|     if (data_field_length > 0) { | | |
|         PVR_assist_tier_pic_num | 3 | uimsbf |
|         PVR_assist_block_trick_mode_present_flag | 1 | bslbf |
| SHALL_BE_ZERO PVR_assist_pic_struct_present_flag | 1 | bslbf |
| SHALL_BE_ZERO | 1 | bslbf |
|     PVR_assist_tier_next_pic_in_tier_present_flag | | |
| SHALL_BE_ZERO PVR_assist_substream_info_present_flag | 1 | bslbf |
|         PVR_assist_extension_present_flag | 1 | bslbf |
|         if (PVR_assist_block_trick_mode_present_flag == "1") { | | |
|             PVR_assist_pause_disable_flag | 1 | bslbf |
|     PVR_assist_fwd_slow_motion_disable_flag | 1 | bslbf |
|             PVR_assist_fast_fwd_disable_flag | 1 | bslbf |
|             PVR_assist_rewind_disable_flag | 1 | bslbf |
|             PVR_assist_reserved_0 | 4 | "0000" |
|         } | | |
|         *if (PVR_assist_pic_struct_present_flag == "1") {* | | |
|             *PVR_assist_pic_struct* | *4* | *uimsbf* |
|             *PVR_assist_reserved_0* | *4* | *"0000"* |
|         *}* | | |
|         *if (PVR_assist_tier_next_pic_in_tier_present_flag == "1") {* | | |
|             *PVR_assist_tier_next_pic_in_tier* | *7* | *uimsbf* |
|             *PVR_assist_reserved_0* | *1* | *"0"* |
|         *}* | | |
|         *if (PVR_assist_substream_info_present_flag == "1") {* | | |
|             *for ( i = 0; i < 4; i++) {* | | |
|                 *PVR_assist_substream_flag_i* | *1* | *bslbf* |
|             *}* | | |
|     *PVR_assist_substream_speed_info_present_flag* | *1* | *bslbf* |
|     *PVR_assist_substream_1x_decodable_flag* | *1* | *bslbf* |
|             *PVR_assist_reserved_0* | *2* | *"00"* |
|             *if (PVR_assist_substream_speed_info_present_flag == "1") {* | | |
|                 *for ( i = 0; i < 4; i++) {* | | |
|     *PVR_assist_substream_speed_idx_i* | *4* | *uimsbf* |
|                 *}* | | |
|             *}* | | |
|         *}* | | |
|         if (PVR_assist_extension_present_flag == "1") { | | |
| SHALL_BE_ZERO | 1 | bslbf |
|     PVR_assist_segmentation_info_present_flag | | |
| SHALL_BE_ZERO | 1 | bslbf |
|     PVR_assist_tier_m_cumulative_frames_present_flag | | |
| SHALL_BE_ZERO | 1 | bslbf |
|     PVR_assist_tier_n_mmco_present_flag | | |
|             PVR_assist_temporal_id_info_present_flag | 1 | bslbf |
|             PVR_assist_reserved_0 | 4 | "0000" |
|         if (PVR_assist_segmentation_info_present_flag == "1") { | | |
|             *PVR_assist_seg_id* | *8* | *uimsbf* |
|             *PVR_assist_prg_id* | *16* | *uimsbf* |
|             *PVR_assist_seg_start_flag* | *1* | *bslbf* |
|             *PVR_assist_seg_end_flag* | *1* | *bslbf* |
|             *PVR_assist_prg_start_flag* | *1* | *bslbf* |
|             *PVR_assist_prg_stop_flag* | *1* | *bslbf* |
|     *PVR_assist_scene_change_flag* | *1* | *bslbf* |
|             *PVR_assist_reserved_0* | *3* | *"000"* |
|         *}* | | |
|         *if (PVR_assist_tier_m_cumulative_frames_present_flag == "1") {* | | |
|             *PVR_assist_tier_m* | *3* | *uimsbf* |
| | *5* | *uimsbf* |
|     *PVR_assist_tier_m_cumulative_frames* | | |
|         *}* | | |
|         *if (PVR_assist_tier_n_mmco_present_flag == "1") {* | | |
|             *PVR_assist_tier_n_mmco* | *3* | *uimsbf* |
|             *PVR_assist_reserved_0* | *5* | *"00000"* |
|         *}* | | |
|         *if* | | |

TABLE 5-continued

PVR_assist_information data field

| Syntax | No. bits | Mnemonic |
|---|---|---|
| (PVR_assist_temporal_id_info_present_flag == "1") { | | |
|     PVR_assist_max_temporal_id | 3 | uimsbf |
|     PVR_assist_reserved_0 | 5 | "00000" |
| } | | |
| } | | |
|   for (i=0; i<n; i++) { | | |
|     PVR_assist_reserved_byte | 8 | uimsbf |
|   } | | |
| } | | |
| } | | |

Minimum length with enforced zeros: 3 bytes
Trick mode flags: +1 byte
Temporal ID max: +2 bytes
(Adaptation overhead is 3 bytes).

Simplified DVB Structure

TABLE 6

PVR_assist_information data field

| Syntax | No. bits | Mnemonic |
|---|---|---|
| PVR_assist_information( ) { | | |
|   data_field_tag | 8 | uimsbf |
|   data_field_length | 8 | uimsbf |
|   if (data_field_length > 0) { | | |
|     PVR_assist_tier_pic_num | 3 | uimsbf |
|     PVR_assist_block_trick_mode_present_flag | 1 | bslbf |
|     PVR_assist_shall_be_zero | 3 | "000" |
|     PVR_assist_extension_present_flag | 1 | bslbf |
|     if (PVR_assist_block_trick_mode_present_flag == "1") { | | |
|       PVR_assist_pause_disable_flag | 1 | bslbf |
|       PVR_assist_fwd_slow_motion_disable_flag | 1 | bslbf |
|       PVR_assist_fast_fwd_disable_flag | 1 | bslbf |
|       PVR_assist_rewind_disable_flag | 1 | bslbf |
|       PVR_assist_reserved_0 | 4 | "0000" |
|     } | | |
|     if (PVR_assist_extension_present_flag == "1") { | | |
|       PVR_assist_shall_be_zero | 3 | "000" |
|       PVR_assist_temporal_id_info_present_flag | 1 | bslbf |
|       PVR_assist_reserved_0 | 4 | "0000" |
|       if (PVR_assist_temporal_id_info_present_flag == "1") { | | |
|         PVR_assist_max_temporal_id | 3 | uimsbf |
|         PVR_assist_reserved_0 | 5 | "00000" |
|       } | | |
|     } | | |
|     for (i=0; i<n; i++) { | | |
|       PVR_assist_reserved_byte | 8 | uimsbf |
|     } | | |
|   } | | |
| } | | |

Simplified Alternative Structure (not DVB Compatible)

TABLE 7

PVR_assist_information data field

| Syntax | No. bits | Mnemonic |
|---|---|---|
| PVR_assist_information( ) { | | |
|   data_field_tag | 8 | uimsbf |
|   data_field_length | 8 | uimsbf |
|   if (data_field_length > 0) { | | |
|     PVR_assist_tier_pic_num | 3 | uimsbf |
|     PVR_assist_block_trick_mode_present_flag | 1 | bslbf |

TABLE 7-continued

PVR_assist_information data field

| Syntax | No. bits | Mnemonic |
|---|---|---|
|         PVR_assist_temporal_id_info_present_flag | 1 | bslbf |
|     if (PVR_assist_block_trick_mode_present_flag == "1") { | | |
|         PVR_assist_pause_disable_flag | 1 | bslbf |
|     PVR_assist_fwd_slow_motion_disable_flag | 1 | bslbf |
|         PVR_assist_fast_fwd_disable_flag | 1 | bslbf |
|         PVR_assist_rewind_disable_flag | 1 | bslbf |
|         PVR_assist_reserved_0 | 4 | "0000" |
|     } | | |
|     if (PVR_assist_temporal_id_info_present_flag == "1") { | | |
|         PVR_assist_max_temporal_id | 3 | uimsbf |
|         PVR_assist_reserved_0 | 5 | "00000" |
|     } | | |
|         for (i=0; i<n; i++) { | | |
|         PVR_assist_reserved_byte | 8 | uimsbf |
|         } | | |
|     } | | |
| } | | |

Minimum length with enforced zeros: 3 bytes
Trick mode flags: +1 byte
Temporal ID max: +1 bytes [ONLY difference from DVB]
(Adaptation overhead is 3 bytes).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of processes identified in FIGS. 3 and 4 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIGS. 3 and 4, either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the VP systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

We claim:

1. A method for processing a video stream comprising:
receiving the video stream at a video processing device, the video stream comprising video usability syntax elements, the video usability syntax elements comprising a first flag indicative of whether Hypothetical Reference Decoder (HRD) parameters are present for one of: fixed frame rate processing or low delay mode processing, the video usability syntax elements further comprising a second flag indicative of whether the video stream comprises field-coded video sequences, wherein a first value of the first flag indicates the fixed frame rate processing and a second value of the first flag indicates the low delay mode processing, wherein the low delay mode processing requires that all pictures in the video stream comprise a presentation time stamp (PTS) equal to or inferred as equal to each picture's respective decoding time stamp (DTS, and wherein each picture's respective DTS is not present in a packetized elementary stream (PES) packet header;
receiving personal video recording (PVR) assist information in the video stream, wherein the PVR assist information pertains to picture interdependencies with successive tier numbers to extract a self-decodable stream from the video stream, wherein the PVR assist information comprises a third flag indicating to block trick mode over a corresponding segment of the video stream in which the third flag is effective, and wherein the third flag is signaled at each random access point over a duration of the corresponding segment when the trick mode is blocked over the corresponding segment comprising successive random access pictures;
inferring a third value associated with a fourth flag indicative of a fixed picture rate based on the first value of the first flag; and
outputting the video stream at the video processing device based on the first flag, the second flag, the third flag, and the fourth flag.

2. The method of claim 1, wherein the low delay mode processing requires that all pictures in the video stream are one of: intra-coded pictures or forward predicted pictures (FPPs).

3. The method of claim 1, wherein the low delay mode processing requires that all pictures in the video stream comprise a PTS greater than an immediately prior picture.

4. The method of claim 1, wherein the low delay mode processing requires that each decoded picture in the video stream is output repeatedly until a next decoded picture is available.

5. The method of claim 1, wherein a coded picture buffer (CPB) underflows during the low delay mode processing.

6. The method of claim 1, wherein outputting the video stream comprises outputting the video stream comprising at least one of the following: a broadcast service, a time-shifting service, a PVR/DVR service, a Video-on-Demand service, and splicing service.

7. The method of claim 1, further comprising inferring the second value of the first flag when the first value of the flag is not present.

8. A method for processing a video stream comprising:
encoding the video stream at a headend device, the video stream comprising video usability syntax elements, the video usability syntax elements comprising a first flag indicative of whether Hypothetical Reference Decoder (HRD) parameters are present for one of: fixed frame rate processing or low delay mode processing, the video usability syntax elements further comprising a second flag indicative of whether the video stream comprises field-coded video sequences, wherein the first value of the first flag allows a third value for a third flag indicative of a fixed picture rate to be inferred, wherein a first value of the first flag indicates the fixed frame rate processing and a second value of the first flag indicates the low delay mode processing, wherein the low delay mode processing requires that all pictures in the video stream comprise a presentation time stamp (PTS) equal to or inferred as equal to each picture's respective decoding time stamp (DTS), and wherein each picture's respective DTS is not present in a packetized elementary stream (PES) packet header;
providing personal video recording (PVR) assist information in the video stream, wherein the PVR assist information pertains to picture interdependencies with successive tier numbers to extract a self-decodable stream from the video stream, wherein the PVR assist information comprises a fourth flag indicating to block trick mode over a corresponding segment of the video stream in which the fourth flag is effective, and wherein the third flag is signaled at each random access point over a duration of the corresponding segment when the trick mode is blocked over the corresponding segment comprising successive random access pictures; and
transmitting the video stream from the headend device.

9. The method of claim 8, wherein the low delay mode processing requires that all pictures in the video stream are one of: intra-coded pictures or forward predicted pictures (FPPs).

10. The method of claim 8, wherein the low delay mode processing requires that all pictures in the video stream comprise a PTS greater than an immediately prior picture.

11. The method of claim 8, wherein the low delay mode processing requires that each decoded picture in the video stream is output repeatedly until a next decoded picture is available.

12. The method of claim 8, wherein a coded picture buffer (CPB) underflows during low delay mode processing.

13. The method of claim 8, wherein transmitting the video stream comprises outputting the video stream comprising at least one of the following: a broadcast service, a time-shifting service, a PVR/DVR service, a Video-on-Demand service, and splicing service.

14. The method of claim 8, further comprising inferring the second value of the first flag when the first value of the first flag is not present.

15. A video processing system comprising:
a memory; and
one or more processors configured to execute instructions stored in the memory, the instructions comprising:
receiving the video stream at a video processing device, the video stream comprising video usability syntax elements, the video usability syntax elements comprising a first flag indicative of whether Hypothetical Reference Decoder (HRD) parameters are present for one of: fixed frame rate processing or low delay mode processing, the video usability syntax elements further comprising a second flag indicative of whether the video stream comprises field-coded video sequences, wherein a first value of the first flag indicates the fixed frame rate processing and a second value of the first flag indicates the low delay mode processing, wherein the low delay mode processing requires that all pictures in the video stream comprise a presentation time stamp (PTS) equal to or inferred as equal to each picture's respective decoding time stamp (DTS), and wherein each picture's respective DTS is not present in a packetized elementary stream (PES) packet header;
receiving personal video recording (PVR) assist information in the video stream, wherein the PVR assist information pertains to picture interdependencies with successive tier numbers to extract a self-decodable stream from the video stream, and wherein the PVR assist information comprises a third flag indicating to block trick mode over a corresponding segment of the video stream in which the third flag is effective, and wherein the third flag is signaled at each random access point over a duration of the corresponding segment when the trick mode is blocked over the corresponding segment comprising successive random access pictures;
inferring a third value for a fourth flag indicative of a fixed picture rate based on the first value of the first flag; and
outputting the video stream at the video processing device based on the first flag, the second flag, the third flag, and the fourth flag.

16. The video processing system of claim 15, wherein the low delay mode processing requires that all pictures in the video stream are one of: intra-coded pictures or forward predicted pictures (FPPs).

17. The video processing system of claim 15, wherein the low delay mode processing requires that all pictures in the video stream comprise a PTS greater than an immediately prior picture.

18. The video processing system of claim 15, wherein the low delay mode processing requires that each decoded picture in the video stream is output repeatedly until a next decoded picture is available.

19. The video processing system of claim 15, wherein a coded picture buffer (CPB) underflows during low delay mode processing.

20. The video processing system of claim 15, wherein outputting the video stream comprises outputting the video stream comprising at least one of the following: a broadcast service, a time-shifting service, a PVR/DVR service, a Video-on-Demand service, and splicing service.

* * * * *